(12) United States Patent
Brummel et al.

(10) Patent No.: US 11,687,161 B2
(45) Date of Patent: Jun. 27, 2023

(54) SYSTEM AND METHOD FOR PRODUCING MID-AIR TACTILE STIMULATION

(71) Applicant: Emerge Now Inc., Marina del Rey, CA (US)

(72) Inventors: Nathan E. Brummel, Marina del Rey, CA (US); James D. Hamilton, Marina del Rey, CA (US)

(73) Assignee: Emerge Now Inc., Marina del Rey, CA (US)

( * ) Notice: Subject to any disclaimer, the term of this patent is extended or adjusted under 35 U.S.C. 154(b) by 0 days.

(21) Appl. No.: 17/334,234

(22) Filed: May 28, 2021

(65) Prior Publication Data

US 2021/0286434 A1 Sep. 16, 2021

Related U.S. Application Data

(63) Continuation of application No. 17/189,828, filed on Mar. 2, 2021, now Pat. No. 11,054,910.

(60) Provisional application No. 62/984,048, filed on Mar. 2, 2020.

(51) Int. Cl.
*G06F 3/01* (2006.01)
*G01S 15/66* (2006.01)
*H04R 1/00* (2006.01)

(52) U.S. Cl.
CPC ............. *G06F 3/016* (2013.01); *G01S 15/66* (2013.01); *H04R 1/00* (2013.01); *H04R 2201/003* (2013.01)

(58) Field of Classification Search
None
See application file for complete search history.

(56) References Cited

U.S. PATENT DOCUMENTS

| | | | | |
|---|---|---|---|---|
| 5,817,024 | A | * | 10/1998 | Ogle ................... G01S 15/8915 600/447 |
| 11,054,910 | B1 | * | 7/2021 | Brummel ............... G01S 15/66 |
| 2009/0238490 | A1 | * | 9/2009 | Tamura ................. G09G 3/002 353/70 |
| 2012/0143233 | A1 | | 6/2012 | Sinelnikov |
| 2013/0144165 | A1 | * | 6/2013 | Ebbini ................. A61B 8/0891 600/439 |
| 2014/0125468 | A1 | | 5/2014 | Makinen et al. |

(Continued)

OTHER PUBLICATIONS

Derek Wilson, Triple Buffering: Why We Love It, anandtech.com/show/2794/2 (Jun. 26, 2009) (accessed Aug. 26, 2022) (Year: 2009).*

(Continued)

*Primary Examiner* — Walter F Briney, III
(74) *Attorney, Agent, or Firm* — Jeffrey Schox; Caitlin Ploch

(57) ABSTRACT

A system for producing tactile stimulation includes a processing subsystem. Additionally or alternatively, the system can include a tactile device, input devices, and/or any other suitable components. A method for providing tactile stimulation includes receiving a set of waveform signals associated with a set of transducers; assigning a set of waveform parameters to the set of transducers based on the set of waveform signals; and controlling the set of transducers based on the set of waveform parameters. Additionally or alternatively, the method can include organizing the waveform signals into a set of groupings and/or any other suitable processes.

19 Claims, 14 Drawing Sheets

(56) References Cited

U.S. PATENT DOCUMENTS

| | | | |
|---|---|---|---|
| 2014/0267069 A1* | 9/2014 | Dionne | G06F 3/016 |
| | | | 345/173 |
| 2016/0246374 A1 | 8/2016 | Carter et al. | |
| 2017/0123499 A1 | 5/2017 | Eid | |
| 2017/0153707 A1 | 6/2017 | Subramanian et al. | |
| 2019/0197840 A1* | 6/2019 | Kappus | H04S 7/30 |
| 2020/0258357 A1 | 8/2020 | Horiuchi | |

OTHER PUBLICATIONS

International Search Report and Written Opinion for application No. PCT/US21/020478 dated May 6, 2021.

* cited by examiner

○ Group 1: actuated at time $t_1$

● Group 2: actuated at time $t_2$

Variations of transducer arrangements

Transducers

Transducers

SYSTEM AND METHOD FOR PRODUCING MID-AIR TACTILE STIMULATION

CROSS-REFERENCE TO RELATED APPLICATIONS

This application is a continuation of U.S. application Ser. No. 17/189,828, filed 2 Mar. 2021, which claims the benefit of U.S. Provisional Application No. 62/984,048 filed 2 Mar. 2020, which is incorporated in its entirety by this reference.

TECHNICAL FIELD

This invention relates generally to the tactile stimulation field, and more specifically to a new and useful system and method for producing mid-air tactile stimulation in the tactile stimulation field.

BACKGROUND

Recent advances in immersive technologies (e.g., virtual reality, augmented reality, etc.) have shown that tactile stimulation or the sensation of touch, is a powerful way to provide information to a user and/or supplement content (e.g., audio content, visual content, etc.) provided to a user.

Most conventional haptic devices for this require garments and/or handheld devices which provide haptic stimulation, such as through motors or other vibratory elements—these devices, however, typically decrease the user's range of motion and freedom, thereby preventing the user from having a fully immersive experience.

Recent advances in ultrasound systems have shown these to be a promising avenue for providing tactile stimulation, as they can be used to provide mid-air stimulation. Creating mid-air ultrasound stimulation, however, is highly complex. One complication is the audible noise created by the control and abrupt changes in the stimulation being provided, which is conventionally needed to provide high-resolution, low-latency stimulation. These abrupt changes result in large instantaneous changes in the acoustic field proximal to the device, resulting in significant and unpleasant audible noise to the user as well as significant wear on the electronic components of the device.

Thus, there is a need in the tactile stimulation field to create an improved and useful system and method for providing mid-air tactile stimulation. The inventors have discovered such a system and method for mitigating this noise and providing mid-air tactile stimulation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
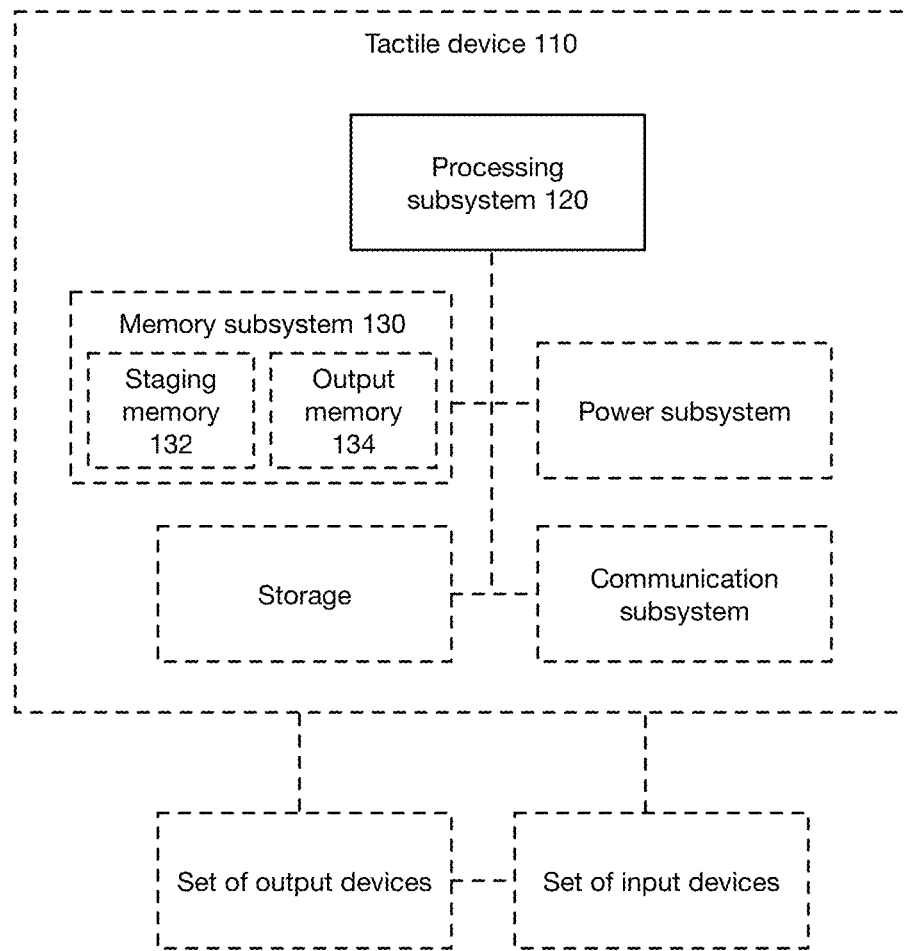
FIG. 2 is a schematic representation of a system for producing mid-air tactile stimulation.

As shown in FIG. 2, a system 100 for producing mid-air tactile stimulation includes a processing subsystem. Additionally or alternatively, the system can include any or all of: a tactile device, a set of input devices, and/or any other suitable components.

Further additionally or alternatively, the system 100 can include and/or interface with any or all of the systems, components, embodiments, and/or examples described in PCT/US18/66087, filed 17 Dec. 2018, and PCT/US19/21699, filed 11 Mar. 2019, each of which is incorporated herein in its entirety by this reference.

Figure 1:
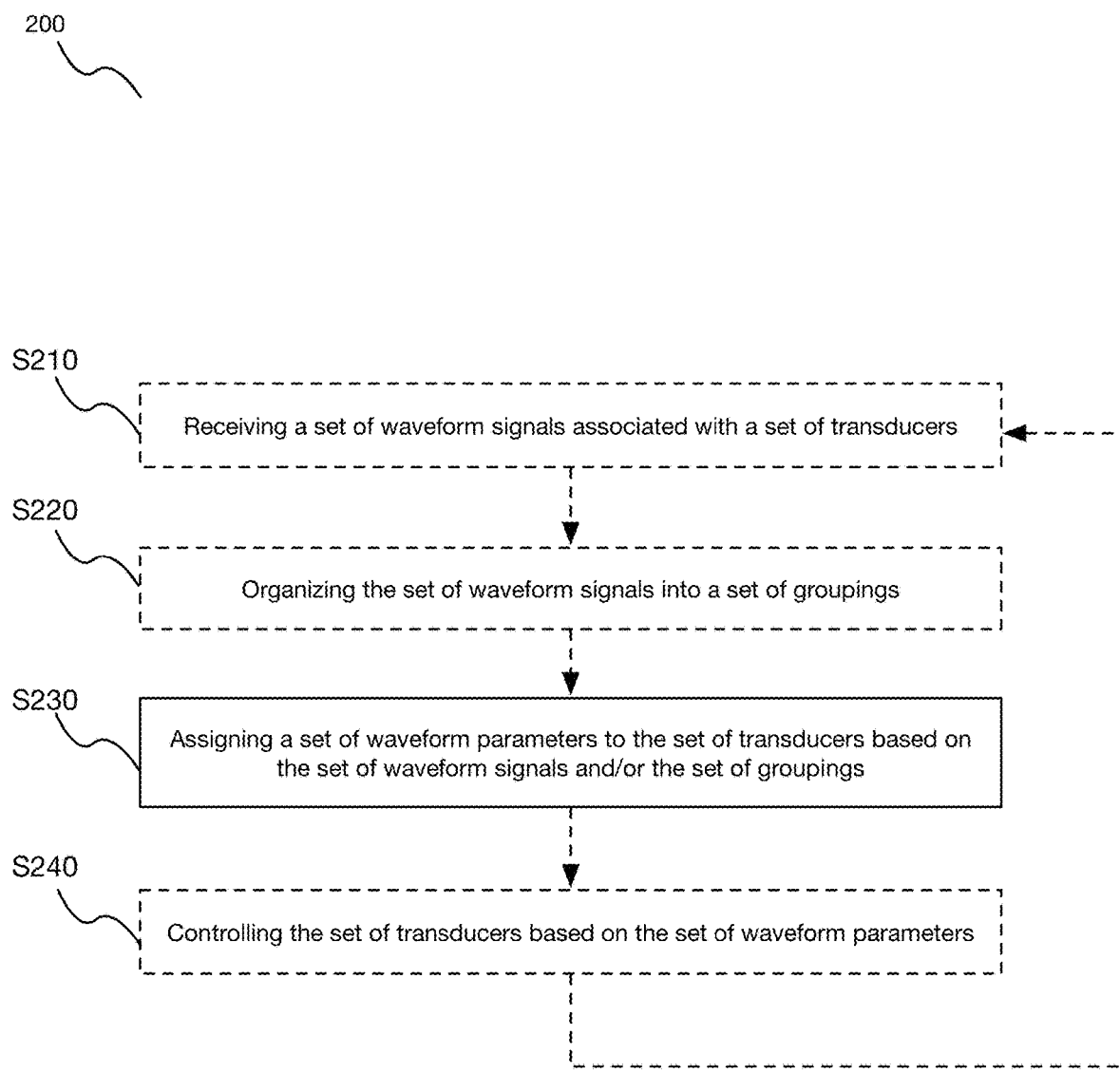
FIG. 1 is a schematic representation of a method for producing mid-air tactile stimulation.

As shown in FIG. 1, a method 200 for providing mid-air tactile stimulation includes receiving a set of waveform signals associated with a set of transducers S210; assigning a set of waveform parameters to the set of transducers based on the set of waveform signals S230; and controlling the set of transducers based on the set of waveform parameters S240. Additionally or alternatively, the method 200 can include any or all of: organizing the set of waveform signals into a set of groupings S220 and/or any other suitable processes. The method 200 can be performed with a system 100 as described above and/or any other suitable system.

Further additionally or alternatively, the method 200 can include and/or interface with any or all of the methods, processes, embodiments, and/or examples described in PCT/US18/66087, filed 17 Dec. 2018, and PCT/US19/21699, filed 11 Mar. 2019, each of which is incorporated herein in its entirety by this reference.

2. Benefits

The system and method for mid-air tactile stimulation can confer several benefits over current systems and methods.

In a first variation, the system and/or method confers the benefit of minimizing and/or eliminating audible noise produced by a set of ultrasound transducers while changing parameters (e.g., phase, amplitude, frequency, etc.) in order to adjust the tactile stimulation being provided to the user. In specific examples, the system and/or method enables tactile stimulation produced by an array of multiple ultrasound transducers to adjust (e.g., move, change, etc.) with minimal or no audible noise through the use of a dual memory architecture in combination with group control of the array of transducers. In alternative examples, the system and/or method enables tactile stimulation through the use of one of a dual memory architecture and group control.

In a second variation, the system and/or method additionally confers the benefit of producing high resolution and low latency tactile stimulation with minimal and/or no audible noise as the tactile stimulation is adjusted.

In a third variation, additional or alternative to those described above, the system and/or method confers the benefit of minimizing and/or preventing wear of components of the tactile device (e.g., transducers, driver subsystem, etc.), which can be caused, for instance, by sudden and drastic changes in the output of the transducers. In specific examples, this is enabled with one or both of a dual memory architecture, which lessens and/or minimizes the drastic transitions in transducer outputs, and a group control module which reduces the number of transducers experiencing a change in output at any given time and/or maximizes a distance between transducers experiencing a change in output at any given time.

Additionally or alternatively, the system and method can confer any other benefit(s).

3. System

As shown in FIG. 2, a system 100 for producing mid-air tactile stimulation includes a processing subsystem. Additionally or alternatively, the system can include any or all of: a tactile device, a set of input devices, and/or any other suitable components.

The system 100 functions to provide tactile stimulation (equivalently referred to herein as haptic stimulation) perceivable by a user, wherein the tactile stimulation is preferably in the form of airborne ultrasound stimulation (e.g., having a frequency of at least 20 kilohertz [kHz], having a frequency of at least 10 kHz, having a frequency of at least 15 kHz, having a frequency between 20 kHz and 300 kHz, having a frequency between 20 kHz and 100 kHz, having a frequency between 5 kHz and 50 kHz, having a frequency between 5 kHz and 1 megahertz [MHz], having a frequency between 10 kHz and 50 MHz, etc.), but can additionally or alternatively include any other forms of stimulation and/or acoustic energy having any other suitable frequencies. Further additionally or alternatively, the system can be implemented with coherent electromagnetic signals (e.g., RADAR, LIDAR, terahertz imaging, etc.), acoustic signals (e.g., sonar, medical ultrasound with frequencies typically between 2 MHz-50 Mhz, etc.) and/or any other signals.

The tactile stimulation is preferably provided mid-air (equivalently referred to herein as in-air), wherein mid-air refers to stimulation that is perceivable remote from a physical component of a device (e.g., above a surface of the tactile device, proximal to but offset from a surface of the tactile device, within a predetermined distance relative to one or more surfaces of a tactile device, etc.), but can additionally or alternatively provide stimulation at one or more physical components (e.g., at one or more surfaces of the tactile device, with a supplementary tactile device, etc.) and/or provide any other stimulation.

The tactile stimulation (equivalently referred to herein as haptic stimulation) preferably includes ultrasound stimulation, wherein ultrasound stimulation refers to acoustic stimulation (e.g., acoustic energy) having a frequency above the audible frequency range and within the ultrasound frequency range (e.g., frequency of 20 kHz or greater, frequency between 20 and 100 kHz, frequency between 20 kHz and 2 MHz, etc.). Additionally or alternatively, tactile stimulation can be provided at another frequency (e.g., proximal to ultrasound frequency, less than 20 kHz, greater than 10 kHz, etc.) and/or in other forms (e.g., with a set of vibratory motors and/or actuators).

The system 100 further preferably functions to smoothly adjust the tactile stimulation provided to a user, which functions to minimize and/or eliminate audible noise associated with conventional adjustments of ultrasound stimulation (e.g., as described below). Adjusting the tactile stimulation preferably includes changing the location of the tactile stimulation relative to the user (e.g., based on the user's location as determined with a tracking subsystem, based on movement of a digital object being represented with tactile stimulation, etc.), but can additionally or alternatively include changing any or all of: an amplitude and/or intensity of tactile stimulation, an effect associated with the tactile stimulation (e.g., a textural effect being portrayed with the tactile stimulation), and/or any other features of the tactile stimulation.

The system preferably includes and/or interfaces with a tactile device used to provide the stimulation and optionally with any or all of: one or more input devices (e.g., as described below), one or more output devices (e.g., displays), and/or any other suitable components.

The system 100 is preferably implemented for use in one or more immersive computing technologies and/or platforms, such as virtual reality (VR), augmented reality (AR), mixed reality (MR), and/or any other suitable platforms, which can be used for instance in gaming or other forms of entertainment, increasing an immersive quality of conversations (e.g., with 3D tactile interactions) and/or viewing of videos (e.g., for 3D teleconferencing), and/or the system 100 can be used with any other suitable platforms.

3.1 System: Tactile Device 110

The system 100 preferably includes and/or interfaces with a tactile device 110, which functions to produce tactile stimulation which a user can detect and/or interact with, based on tactile data and/or commands, such as any or all of those produced by the method 200 as described below. The tactile stimulation is preferably in the form of ultrasound stimulation, but can additionally or alternatively include any other forms of tactile/haptic stimulation perceivable by a human. Additionally or alternatively, the system 100 can include and/or interface with any other suitable devices.

Figure 3A:
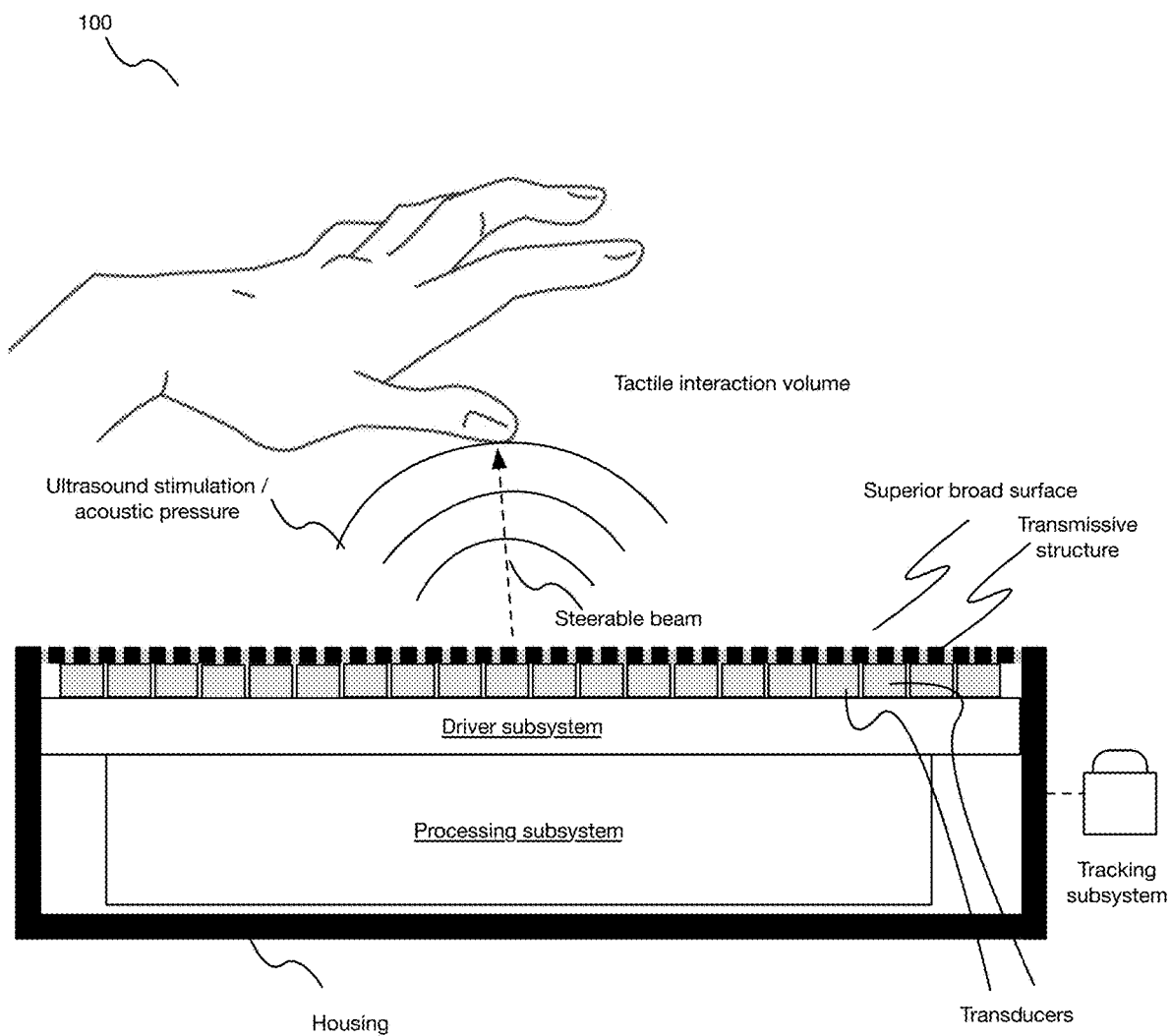
FIGS. 3A-3B depict assembled and exploded views, respectively, of a variation of a system for producing mid-air tactile stimulation.

The tactile device is preferably configured as a tabletop device (e.g., as shown in FIG. 3A), wherein the tabletop device defines a superior broad surface through which tactile stimulation is provided, wherein the user can interact with the tactile stimulation in mid-air above the superior broad surface. Additionally or alternatively, the tactile device can include and/or be configured as any or all of: a wearable device (e.g., glove, garment, etc.), a graspable device (e.g., handheld device), a standalone device, a device integrated within another component and/or system, and/or any other device.

The tactile device includes a set of transducers, wherein the tactile device produces tactile sensations through the set of transducers. The set of transducers are preferably ultrasound transducers (equivalently referred to herein as ultrasonic transducers), which individually and/or collectively produce ultrasonic tactile sensation, preferably acoustic radiation pressure in the ultrasonic frequency range, which the user can detect in air, such as within the air proximal to the tactile device, but additionally or alternatively at any other suitable locations.

The transducers preferably provide stimulation through a set of signals, each of which is associated with one or more stimulation parameters, wherein the stimulation parameters can include, but are not limited to, any or all of: phase, amplitude, frequency, waveform shape/type (e.g., square wave, sine wave, ramp up and/or ramp down, etc.), and/or any other stimulation parameters. Any or all of the stimulation parameters can be fixed (e.g., predetermined, constant, etc.), variable (e.g., independently controllable, determined based on one or more algorithms, dynamically determined, etc.), and/or any combination.

The stimulation parameters include a phase (equivalently referred to herein as a phase shift) associated with each of the transducers, wherein the phase reflects a timing of the stimulation provided by the transducer. This timing is preferably a relative timing (e.g., a time delay) with respect to the signals emitted by other transducers in the set, wherein adjustment of the phase values and optionally other parameters (e.g., amplitude) of the transducers results in changes to the ultrasound stimulation collectively provided, such as a change in location of the tactile sensation. Additionally or alternatively, the phase can be otherwise defined and/or result in any other suitable changes to the tactile stimulation.

The signals are further preferably associated with one or more amplitude values, wherein the amplitude value indicates a voltage associated with the signal. The amplitude values and/or range of amplitude values are preferably predetermined and fixed. In some examples, for instance, the signals include square waves which oscillate between a fixed maximum amplitude value and a fixed minimum amplitude value (e.g., zero). The amplitude values are further preferably the same among all transducers, but can additionally or alternatively vary among transducers. Additionally or alternatively, the amplitude values can be dynamically determined and/or adjusted.

The signals are further preferably associated with one or more frequency (and/or period) values. The frequency of each transducer is preferably fixed and further preferably the same among all transducers. Additionally or alternatively, any or all of the frequencies can be dynamically determined, can vary among transducers, and/or be otherwise determined. The frequency or frequency values are preferably determined in accordance with the frequency and/or frequency range associated with the transducers (e.g., selected to match an output frequency associated with the transducer), but can additionally or alternatively be otherwise determined and/or selected.

In preferred variations, each of the transducers receives a signal in the form of a square wave, wherein the square wave has an associated phase value (e.g., at any given time), an amplitude value wherein the square wave oscillates between an amplitude of zero and a maximum amplitude value (e.g., fixed amplitude value, variable amplitude value, dynamically determined amplitude value, etc.), and a frequency and/or half period width values characterizing the shape of the square wave.

In specific examples, each of the square wave signals is an ideal square wave (e.g., perfectly ideal, substantially ideal, etc.) oscillating between a fixed maximum amplitude value and an amplitude of zero. Alternatively, the square wave can be a non-ideal square wave (e.g., with a width of maximum amplitude greater than a width of zero amplitude, with a width of zero amplitude less greater than a width of maximum amplitude, etc.), the square wave can oscillate between non-zero amplitude values, and/or the square wave can be otherwise configured.

The signals emitted by the transducers are preferably related to and provided based on the signals received, but can alternatively be the same (e.g., identical, substantially the same such as an imperfect square wave provided based on a perfect square wave received, etc.), different, or otherwise formed. The signals emitted, for instance, can be determined based on the signals received and also based on impulse and/or frequency parameters inherent to and/or programmed to the transducers. In some variations, for instance, the emitted signals include sinusoidal waveforms having a frequency equal to the transducer's center frequency (e.g., 40 kHz, less than 40 kHz, greater then 40 kHz, between 20 kHz and 60 kHz, etc.), wherein the signal received by the transducers (e.g., square wave) dictates when the output waveform is emitted and when it is not. Additionally or alternatively, the transducers can emit any other waveforms, such as sinusoidal waveforms at another frequency value, sinusoidal waveforms with multiple and/or varying frequency values, non-sinusoidal waveforms (e.g., square wave, ramp, etc.), any combination, and/or any other suitable waveforms.

Additionally or alternatively, the signals can be in any other form(s).

The set of transducers preferably includes multiple transducers (e.g., at least 2, at least 10, at least 20, at least 50, at least 100, at least 200, at least 300, at least 400, 400, between 300 and 500, between 350 and 450, between 100 and 1000, greater than 1000, less than 5000, etc.), wherein the multiple transducers collectively produce tactile stimulation through one or more beamforming processes. The set of multiple transducers can optionally be organized into a set of groups (e.g., as described below), wherein the set of groups function to limit the number of transducers experiencing a change in stimulation parameters (e.g., phase, amplitude, frequency, etc.) at any given time. Additionally or alternatively, the groups can confer other suitable functions, such as maximizing a distance between adjacent transducers experiencing a change in stimulation parameters (e.g., phase change) at any given time, maximizing an average distance between groups experiencing a change in stimulation in a sequential fashion, and/or the groups can confer any other suitable functions. Additionally or alternatively, the transducers can be actuated absent of group assignments (e.g., in a parallel fashion/simultaneously, in a serial fashion/sequentially, etc.) and/or can be otherwise actuated.

The set of transducers can be arranged in any suitable arrangement, wherein the particular arrangement can optionally be configured for any or all of: enabling and/or optimizing a beamforming of the signals emitted by the transducers, enabling at least a minimum threshold spacing between adjacent transducers (e.g., of all the transducers, of transducers in the same group, of transducers in different groups, etc.), enabling at most a maximum threshold spacing between adjacent transducers (e.g., of all the transducers, of transducers in the same group, of transducers in different groups, etc.), minimizing audible noise produced by the set of transducers, maximizing the number of transducers able to be arranged at the tactile device, and/or can be configured for any other purpose.

In some variations, for instance, a spacing of the transducers can be selected to be equal to a fraction (e.g., ⅛, ¼, ½, etc.) and/or a multiple (e.g., 2×, 3×, 4×, etc.) of a wavelength associated with the signals.

Figure 6A:
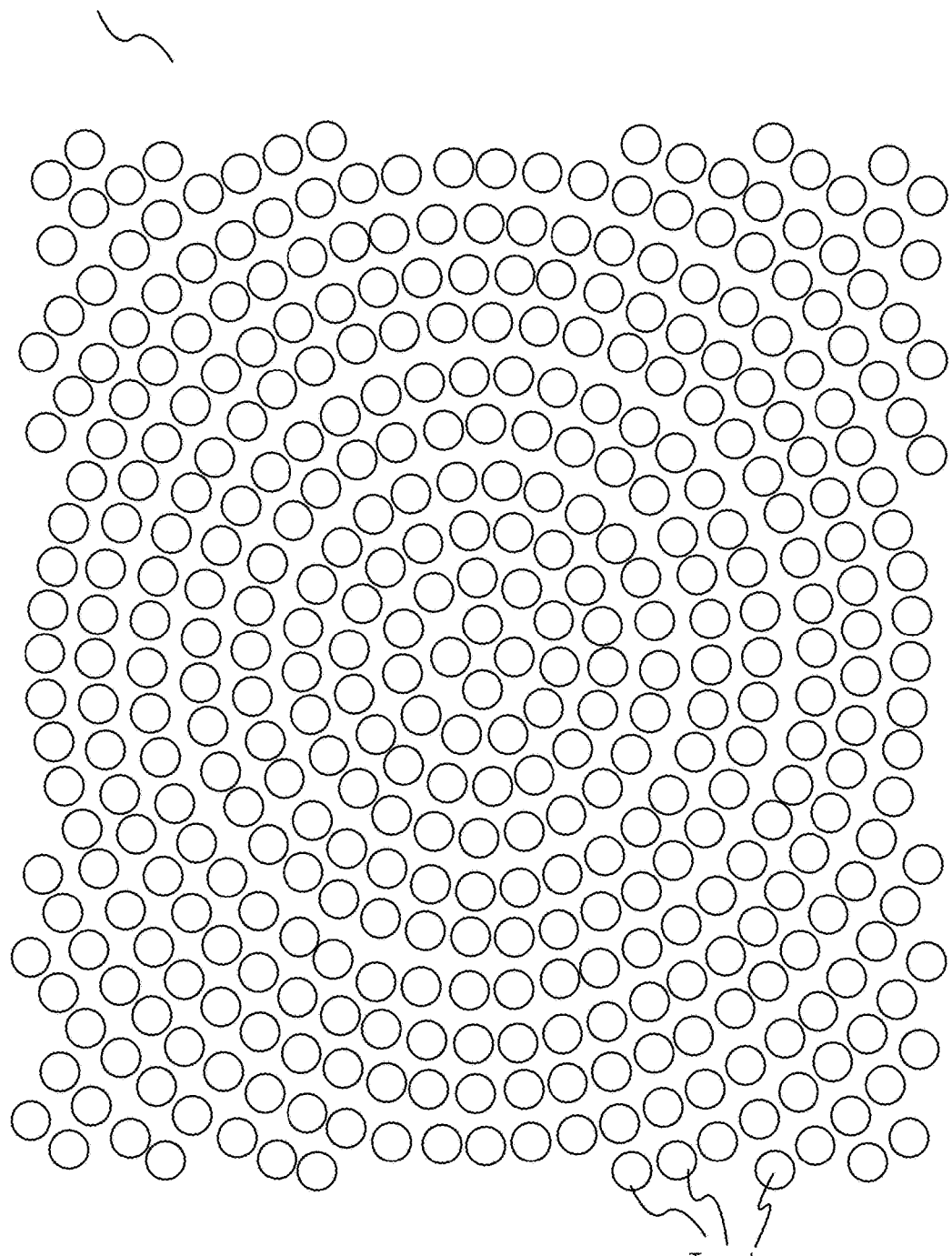
FIGS. 6A-6B depict a variation of an arrangement of transducers and their assignment into groupings.
Figure 6B:
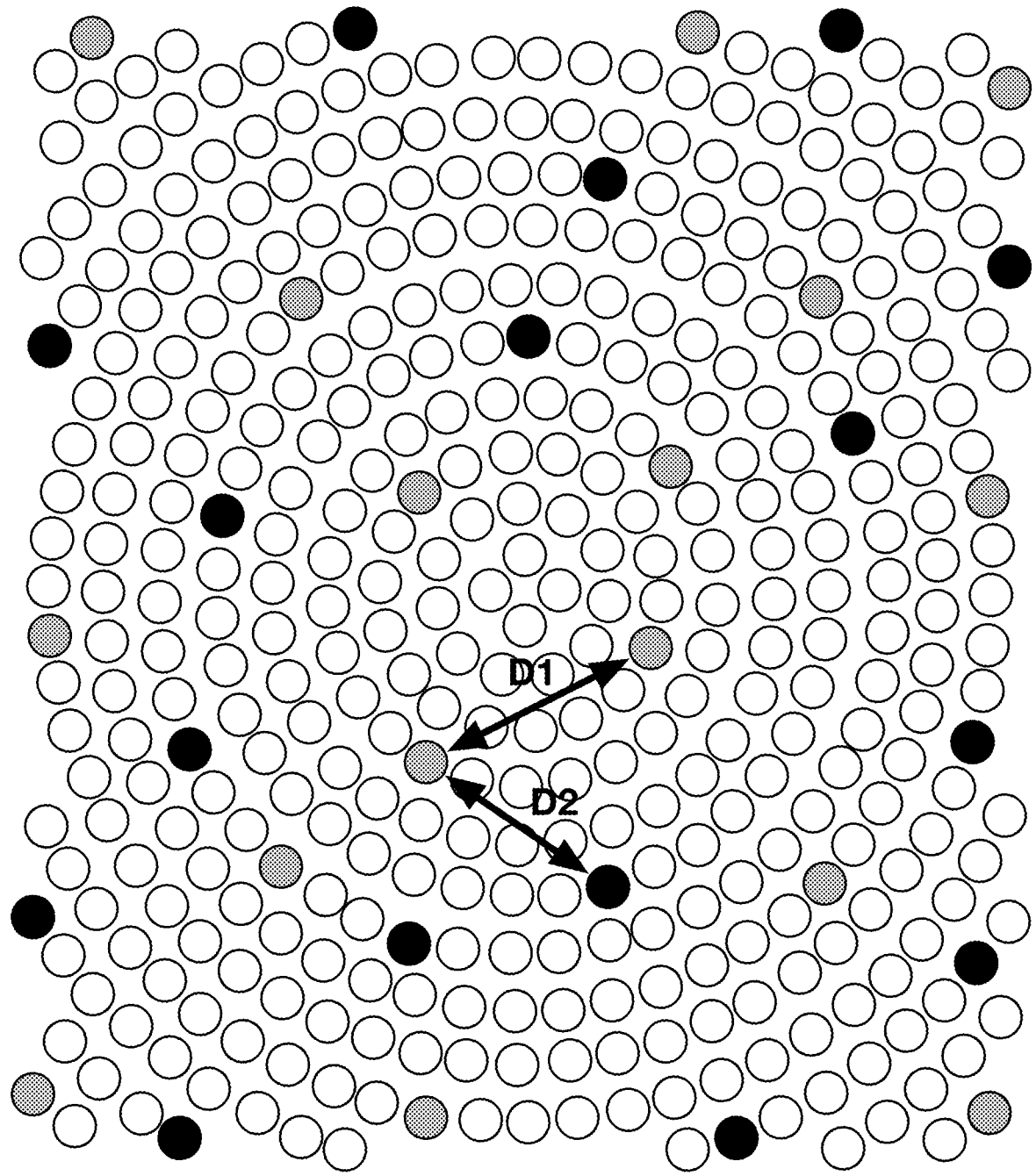

In specific examples, such as shown in FIGS. 6A-6B, the transducers are arranged in a circular pattern.

Figure 7A:
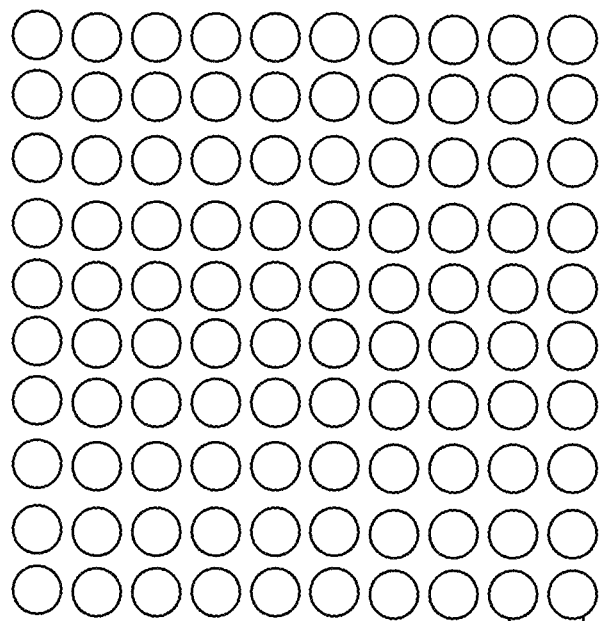
FIGS. 7A-7B depict alternative variations of the arrangement of transducers.
Figure 7B:
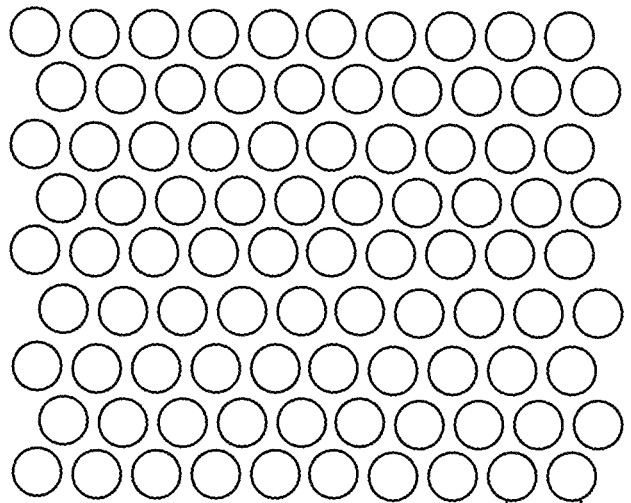

In alternative examples, such as shown in FIG. 7, the transducers can be arranged in one or more grid formations.

Additionally or alternatively, the transducers can be randomly arranged, arranged in a spiral pattern, arranged in any other shaped patterns, and/or be otherwise arranged.

The set of multiple transducers preferably collectively form a phased array, wherein the phased array enables the production of one or more steerable and/or focused beams of ultrasound waves, which can be steered without moving the ultrasound transducers themselves but rather by changing the relative phase of one or more of the set of transducers. Additionally or alternatively, any or all of the transducers can be mechanically moved (e.g., during operation, according to a set of programmed translations and/or rotations, etc.). Each phase of the set of transducers is preferably determined in accordance with one or more beamforming algorithms (e.g., at the processing subsystem 120, at a computing subsystem, etc.), wherein the beamforming algorithms determine a set of phase and amplitude values for the set of transducers based on any or all of: a current location of tactile stimulation, a desired location of a tactile stimulation, a location of the user (e.g., as determined with a tracking subsystem as described below), and/or any other suitable information. In preferred variations, for instance, tactile stimulation is provided to represent a three-dimensional (3D) digital object (equivalently referred to herein as a virtual object), such as an exterior surface of the digital object, wherein a tracking subsystem (e.g., as described below) determines a user's position (e.g., hand position) relative to the digital object and/or tactile device, and wherein the tactile stimulation is provided and adjusted based on this relative position. Additionally or alternatively, tactile stimulation can be otherwise provided.

In some embodiments, for instance, a beamformer controls the phase and amplitude of the signal at each transducer, in order to control the emitted acoustic field, forming a pattern of constructive and destructive interference in the wave front, wherein the location(s) of constructive interference can form localized points of acoustic energy (equivalently referred to herein as focal points) which maximize the acoustic radiation force exerted the transducers, thereby resulting in stimulation perceivable by the user. The system can create a single focal point at any given time, multiple focal points at any given time (e.g., to define a surface), and/or any number of focal points or other spatial distributions of ultrasonic energy.

Additionally or alternatively, beamforming algorithms can be used to determine other parameters (e.g., amplitude, frequency, waveforms, etc.) associated with the set of transducers, the transducers can be controlled in absence of beamforming algorithms and/or with any other suitable algorithms, and/or the transducers can be otherwise controlled.

The set of ultrasound transducers (equivalently referred to herein as ultrasound emitters) preferably includes one or more Micro Electro-Mechanical Systems (MEMS) speaker devices configured to emit sound waves (equivalently referred to herein as acoustic waves) in at least an ultrasonic frequency range (e.g., MEMS ultrasound transducers), but can additionally or alternatively include any other suitable ultrasound devices, such as those producing ultrasonic sensation through an oscillating body, piezoelectric device, and/or resonator (e.g., funneled resonator to radiate ultrasonic energy to the air); and/or any other suitable ultrasound transducer devices.

The ultrasound transducers in the set of ultrasound transducers are preferably identical (e.g., all MEMS transducers), but can alternatively be of different types, be associated with different parameters (e.g., different frequencies, different amplitudes, etc.), and/or be otherwise configured.

The tactile device preferably defines a tactile interaction volume, which refers to a volume (e.g., a volume of air) proximal to (e.g., adjacent to) the tactile device in which a user can receive/perceive tactile sensation from the tactile device. In preferred variations including a tabletop tactile interface device, for instance, the tactile interaction volume is above a superior broad surface of the tactile interface device, wherein the ultrasound transducer devices are arranged in a phased array parallel to the superior broad surface.

In specific examples, ultrasonic tactile sensation is produced at mid-air localized points perceivable by a user with beamforming through a set of algorithms (e.g., beamforming algorithms) implemented at a processing subsystem associated with the tactile device, which enables virtual objects to be accurately and perceivably produced with high tactile resolution. Additionally or alternatively, the transducers can produce any other forms of tactile stimulation through any other suitable algorithms.

The tactile device can include and/or interface with a driver subsystem (equivalently referred to herein as a control subsystem), which functions to control the set of transducers (equivalently referred to herein as transmitters) based on a set of signals determined with a processing subsystem (e.g., as described below). As such, the driver system preferably broadcasts a control signal to one or more of the transducers in the set. The driver subsystem can optionally include any number of components, such as, but not limited to, one or more amplifiers, filters (e.g., high pass filters), power sources, clocks (e.g., for timing of signals), and/or any other suitable components.

Figure 3B:
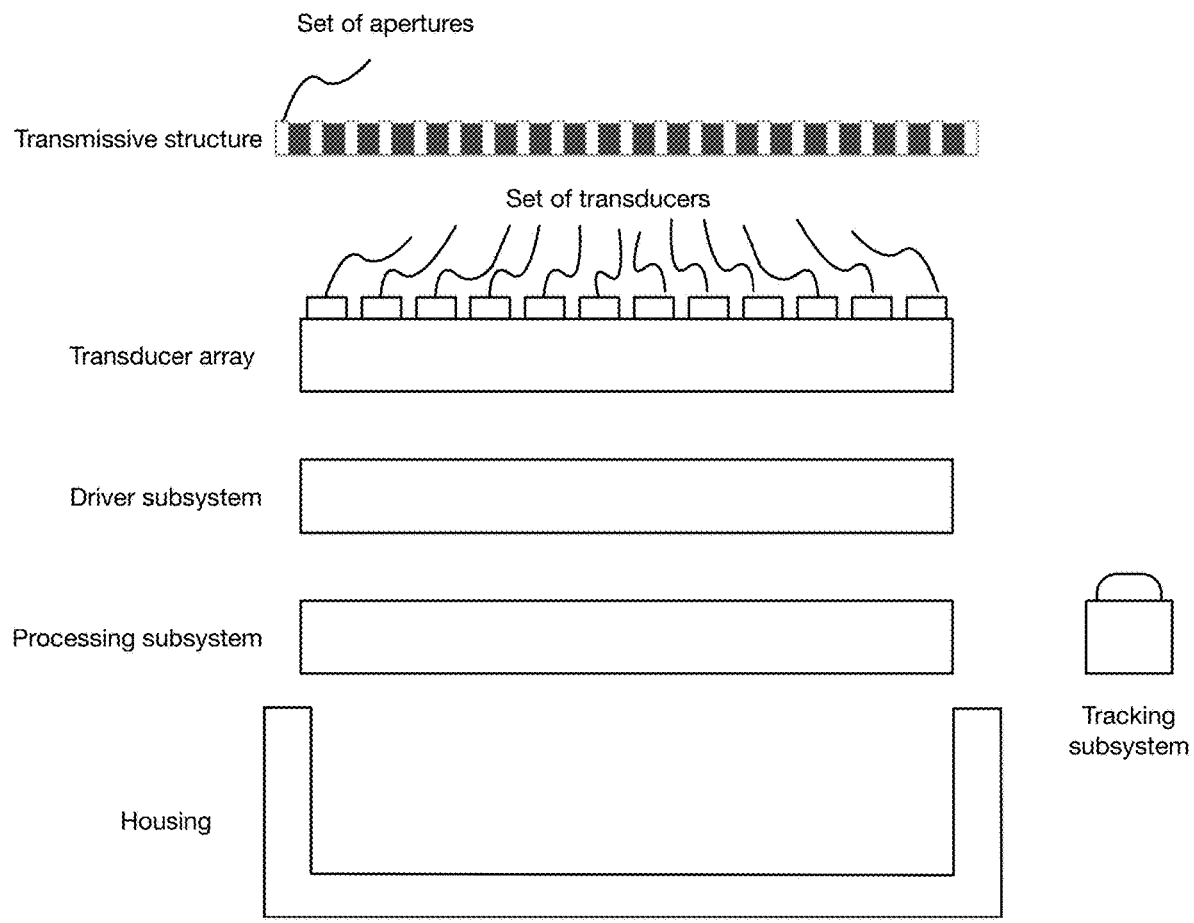

The tactile device can include a housing, wherein the housing can function to enclose and/or protect any or all of the components of the tactile device. The housing preferably includes and/or interfaces with a transmissive structure arranged proximal to the set of transducers (e.g., superior to the transducers as shown in FIGS. 3A-3B), wherein the transmissive structure preferably defines a set of apertures configured to enable ultrasound energy to pass through the transmissive structure and into a tactile interaction volume. The transmissive structure can additionally or alternatively function to minimize (e.g., dampen) and/or filter audible noise associated with the production of the stimulation (e.g., from the signals themselves, from noise of operating the electronics, etc.), protect the transducers from the environment, and/or can perform any other suitable functions. The housing preferably includes one or more rigid materials (e.g., metal, polymer, plastic, etc.), but can additionally or alternatively include any other materials such as fabric (e.g., covering the apertures in the transmissive structures), foams, wood, and/or any other suitable materials.

The tactile device can optionally include any other number of components, such as but not limited to, any or all of: a communication subsystem (e.g., antenna, Wifi chip, Bluetooth chip, etc.) which functions to enable communication between components within the tactile device and/or between the tactile device and other components (e.g., input devices, output devices, etc.); a power source; any or all of a processing subsystem (e.g., as described below) and/or computing subsystem; and/or any other suitable components.

In a first variation (e.g., as shown in FIGS. 3A-3B), the tactile device includes a set of multiple ultrasound transducers arranged in a phased array; a driver subsystem configured to control the set of multiple transducers; any or all of a processing subsystem (e.g., as described below); a housing optionally including a transmissive structure; and/or any other suitable components, wherein the tactile device defines a tactile interaction volume superior to a superior broad surface of the tactile device, wherein a user can sense and interact with ultrasonic energy collectively produced by the set of transducers in accordance with a set of one or more algorithms.

Additionally or alternatively, the tactile device can include any other suitable components and/or be otherwise arranged.

3.2 System: Processing Subsystem 120

The system 100 includes a processing subsystem 120, which functions to determine and adjust the signals emitted by the individual transducers to collectively provide tactile stimulation to the user. The processing subsystem 120 can additionally or alternatively function to reduce audible noise produced by the system, allow for accelerated parallel processing for improved performance, implement a dual memory architecture with which to handle (e.g., schedule) the timing and transition of signals, implement a group control module, and/or can perform any other suitable functions.

In preferred variations, the processing subsystem 120 is used to implement and perform any or all of the method 200 described below. Additionally or alternatively, the processing subsystem 120 can be used to perform any other suitable methods.

The processing subsystem 120 is preferably at least partially arranged onboard the tactile device (e.g., as shown in FIG. 3A), but can additionally or alternatively be arranged offboard and/or remote from the tactile device, such as onboard one or more supplementary devices and/or computing systems. In some variations, for instance, a portion or all of the processing can be arranged onboard a separate computing subsystem, such as a user device (e.g., mobile user device, smartphone, tablet, laptop, XR/VR headset, holographic display, etc.), a remote computing subsystem (e.g., cloud, remote server, etc.), another tactile device (e.g., in a modular setup with multiple devices), and/or at any other devices and/or computing subsystems. In variations in which the processing subsystem is distributed among multiple devices, the processing subsystems are preferably in communication (e.g., wired communication, wireless communication), such as through a communication subsystem (e.g., as described above). Additionally or alternatively, the processing subsystems can operate independently of communication and/or be otherwise operated.

The processing subsystem is preferably in communication with a driver subsystem (e.g., as described above) configured to drive the set of transducers, but can additionally or alternatively be in communication with the set of transducers, a power source, a communication subsystem, one or more input and/or output devices (e.g., as described below), and/or any other suitable components. Additionally or alternatively, any or all of the processing subsystem can be implemented at the driver subsystem, at a computing subsystem, and/or at any other suitable components.

The processing subsystem preferably determines the signals and associated parameters for each of the set of transducers at any given time. This preferably includes a phase associated with each of the signals and optionally any or all of an amplitude, a frequency, and/or any other parameters associated with the signals. The processing system can utilize one or more algorithms responsive to the type of interaction, such as acoustic object shape, texture, volume, and/or other features; a location of interaction (e.g., through hand tracking); and/or any other information to create phase maps (e.g., phase values for tactile device transducers) and optionally intensity values and/or any other signal parameters used to generate signals for driving the transducers.

In preferred variations, for instance, the processing subsystem is used to compute virtual content in an immersive computing workspace, process 3D positional information from tracking subsystem (e.g., as described below) to determine whether a user is in proximity to a virtual object, and translate information into coordinates that are transformed into phase values (e.g., a phase map) and intensity values (e.g., maximum amplitude value) for the transducer array.

The processing subsystem 120 includes a set of one or more processors. The processing subsystem 120 preferably additionally includes and/or interfaces with a memory subsystem. Additionally or alternatively, the processing subsystem 120 can include and/or interface with any or all of: storage, a computing subsystem, a communication subsystem (e.g., as described above), and/or any other suitable components.

Processors of the processing subsystem can include, but are not limited to, any or all of: a general-purpose central processing unit (CPU), a graphics processing unit (GPU), an application-specific integrated circuit (ASIC), a field programmable gate array (FPGA), a digital signal processing unit, or any other types of processors such as Application-specific Standard Products (ASSPs), Systems-on-a-Chip (SOCs), Programmable Logic Devices (PLDs), Digital Signal Processor (DSP), and other similar components. The processing subsystem can include one or more processors, microprocessors, controllers, and/or microcontrollers, each of which can be a discrete chip or distributed amongst (and a portion of) a number of different chips, and collectively, can have the majority of the processing capability for executing instructions stored in memory (e.g., as described below).

The processing subsystem can additionally or alternatively include and/or interface with any other processing technologies such as: dedicated graphics cards that interface with a motherboard, integrated graphics processors ("IGPs") and unified memory architectures. Reference to a GPU can include any or all of graphics processing technologies that include hybrid graphics processing, as well as general purpose graphics processing units (GPGPUs), running compute kernels and external GPUs (eGPUs) that are located remote from the tactile device and/or the system, and/or any other suitable components and/or technologies.

In some variations, the processing subsystem includes a GPU and related electronic circuitry, which function to allow for accelerated parallel processing for improved performance.

The processing subsystem includes and/or interfaces with a memory subsystem 130, wherein the memory subsystem functions to transfer and store information (e.g., instructions) with which to control the transducers according to one or more signals and/or implement any other processes of the method 200. The memory subsystem preferably implements a dual memory architecture, wherein the dual memory architecture includes two memory, and functions to minimize audible noise produced by the system which might arise from the sharp transition in signal due to a phase change. Instead, the dual memory architecture enables a smooth or substantially smooth transition in signal, which prevents and/or minimizes the long periods of time in which a wave (e.g., square wave) is at zero amplitude before transitioning into a new phase. Examples of this are described further below.

The two memory preferably include a staging memory 132, which functions to temporarily hold signal information (e.g., while all entries are being completed) for the set of transducers, and an output memory 134, wherein the information from the output memory is used by the processing subsystem and/or the drive subsystem to control the transducers. Additionally or alternatively, the dual memory architecture can include other memory with other suitable functions, the memory subsystem can include a single memory, the memory subsystem can include more than two memory, and/or the memory subsystem can have any other suitable architecture.

The memory subsystem can include any or all of: volatile memory, such as high-speed random access memory (e.g., Dynamic Random-Access Memory [DRAM], Static Random-Access Memory [SRAM], Double Data Rate Synchronous Dynamic Random-Access Memory [DDR SDRAM], etc.); non-volatile memory (e.g., Read-only memory [ROM], Electrically Erasable Programmable Read-Only Memory [EEPROM], flash memory, etc.); any other memory and/or any combination. The memory subsystem is preferably accessible by and/or in communication with the processing subsystem (e.g., a portion of the processing subsystem, all of the processing subsystem, etc.), but can additionally or alternatively be accessible by and/or in communication with other components of the system (e.g., driver subsystem), and/or any other components. The memory subsystem can optionally include and/or interface with storage (e.g., a storage device), such as a computer-readable storage medium for storing instructions including software to implement the steps of the embodied methods disclosed herein. In specific examples, the storage device can include one or more magnetic disk storage devices (e.g., hard disk drives [HDDs]), optical disk storage devices, Blu-Ray BD-ROMs, DVDs, CD-ROMs, flash memory devices, other non-volatile solid-state storage devices, and/or any other storage devices or combination of storage devices.

The processing subsystem can optionally be operable in a set of operation modes, wherein the operation modes can individually and/or collectively function to determine, assign, and/or control the distribution of signal assignments to the set of transducers. Additionally or alternatively, the set of operation modes can perform any other suitable functions.

The processing subsystem can optionally additionally or alternatively include any number of modules.

The set of modules can optionally include, for instance, a group control module, wherein implementing the group control module functions to mitigate audible noise created by changing the signals (e.g., changing the phase of the square waves) of all the transducers simultaneously, such as by limiting the number of transducers that change signal at any given time, maximizing the spacing between the transducers that change signal at any given time, and/or maximizing the spacing between groups which sequentially change signal. As such, the group control module preferably separates (e.g., based on a predetermined assignment, based on a dynamically determined assignment, etc.) the set of transducers into a set of groupings, wherein both the staging memory and the output memory handle the different groupings separately (e.g., in series, in parallel, etc.). In preferred variations, for instance, the staging memory assigns wave signals to the transducers in each grouping, one grouping at a time, and the output memory is used to generate signals at the groupings one at a time. Additionally or alternatively, the staging memory can be implemented differently (e.g., all signals for all transducers assigned at once), the output memory can be implemented differently (e.g., all signals for all transducers implemented at once), and/or the group control module can be otherwise implemented.

The set of modules can optionally additionally or alternatively include a wave generation module, which functions to generate the signals at each of the transducers, preferably based on the output memory, but additionally or alternatively based on any other memory. The wave generation module is preferably performed in accordance with (e.g., based on, after, simultaneously with, etc.) the group control module, but can additionally or alternatively be performed in accordance with any other modules.

The set of modules can additionally or alternatively include any other suitable modules.

In a first variation, the processing subsystem is arranged onboard the tactile device, wherein the processing subsystem interfaces with a dual memory architecture including a staging memory and an output memory, and wherein the signals emitted by each of the transducers are assigned and provided to the transducers in accordance with a group control module and a wave generation module. In specific examples, the processing subsystem includes a set of one or more processors, wherein the processors include at least a GPU.

In a second variation, a portion of the processing subsystem described in the first variation is arranged offboard the tactile device, such as in another device (e.g., a second tactile device, a user device, a remote computing system, etc.).

Additionally or alternatively, the processing subsystem can be otherwise configured, arranged, and/or perform any other suitable functions.

3.3 System: Other Components

The system 100 can additionally or alternatively include and/or interface with any number of other components.

The system 100 can optionally include and/or interface with one or more input devices, which function to receive information with which to determine the signals of the transducers (e.g., with one or more algorithms such as a beamforming algorithm). Additionally or alternatively, the input devices and the information they collect can be used to trigger one or more processes (e.g., as described below in the method 200) and/or can be otherwise used.

The set of input devices preferably includes one or more tracking subsystems, which function to track the user (e.g., a hand of the user, another body part of the user, the whole user, etc.) to determine: tactile content (e.g., tactile representation of digital objects, transducer signals to produce the tactile content, etc.), visual content (e.g., as displayed at a display of a set of output devices), audio content, and/or any other suitable content, which the method (e.g., as described below) can use in determining the signals of the transducers and/or a need for a change in signal of the transducers (e.g., due to a user's hand moving, due to a digital object moving, etc.). The content can be adjusted in any or all of the following ways based on user actions, such as in: temporal properties of the content (e.g., when content is introduced and applied to the user, when content is adjusted, etc.); where content is applied or adjusted (e.g., in which regions of a tactile interaction volume, which portions of a digital object are applied as tactile sensation, etc.); how content is applied or adjusted (e.g., at which intensity tactile sensation is applied; spatial location of content; temporal variation in parameters of tactile content such as intensity, rate, shape, etc.; etc.); which content is applied or adjusted (e.g., which digital objects are represented through tactile sensation in a tactile interaction volume; which digital objects are visually displayed to the user; etc.); and/or in any other suitable ways.

The tracking subsystem is preferably in communication (e.g., wireless, wired, etc.) with the tactile device, further preferably in communication with the processing subsystem, but can additionally or alternatively be in communication with any other components. The tracking subsystem can additionally or alternatively be part of and/or interface with any or all of: an XR system, another system, any combination of systems, and/or can be independent of any of these systems.

The tracking subsystem can include any suitable tracking device and/or sensors, such as any or all of: optical sensors (e.g., cameras, infrared cameras, etc.); motion and/or orientation sensors (e.g., accelerometers, gyroscopes, inertial measurement units, etc.); acoustic sensors (e.g., microphones, ultrasound transmitters and receivers); and/or any other suitable devices and sensors.

In preferred variations, the tracking system includes one or more optical sensors, such as cameras (e.g., infrared cameras), which function to detect one or more user actions, wherein user actions can include any or all of: a location of a user (e.g., relative to the sensor, relative to a tactile interface and/or the tactile interaction volume, relative to an XR visualization system and/or virtual object within XR visualization system, etc.); a motion parameter of a user (e.g., direction of movement; speed of movement; type of movement such as walking, running, jumping, crouching, sitting, etc.; etc.); an orientation of a user (e.g., a direction a user is facing); a gesture of a user (e.g., a hand gesture); a gaze of the user (e.g., through eye tracking processes); an identity of the user (e.g., through facial recognition algorithms); and/or any other suitable sensors. In specific examples, one or more optical sensors of the tracking system is arranged proximal to the tactile interface device to detect the location of a user's hand relative to the XR visualization system (e.g., relative to a tactile interaction volume of the XR visualization system). For example, the tracking system can be configured to track a user's hand (or hands), including a palm portion, a wrist portion, or one or more fingers of the user; additionally or alternatively, the tracking system can be configured to track other appendages of the user, as well as other objects unrelated to the user's body. Optionally, the XR system can implement one or more optical sensors and/or motion sensors for tracking the user (e.g., position of user within a room, movement of user, etc.).

The input devices can additionally or alternatively include any or all of: a keyboard, mouse, trackpad, touchpad, touchscreen, microphone, voice recognition device, biometric devices, and/or any other devices (e.g., external devices, peripheral devices, etc.) adapted for receiving input from a user.

The system 100 can optionally include and/or interface with one or more output devices, which function to present and/or provide information to the user and/or to other devices. As such the output devices can include any or all of: displays, projects, printers, speakers, and/or any other output devices. The output devices can be any or all of: coupled to the tactile device, remote from the tactile device, coupled to another device (e.g., another tactile device, a user device, etc.), and/or otherwise arranged.

Additionally or alternatively, the system 100 can include any other suitable components.

4. Method 200

As shown in FIG. 1, a method 200 for providing mid-air tactile stimulation includes: receiving a set of waveform signals associated with a set of transducers S210; assigning a set of waveform parameters to the set of transducers based on the set of waveform signals S230; and controlling the set of transducers based on the set of waveform parameters S240. Additionally or alternatively, the method 200 can include any or all of: organizing the set of waveform signals into a set of groupings S220 and/or any other suitable processes. The method 200 can be performed with a system 100 as described above and/or any other suitable system.

The method 200 functions to reduce, minimize, and/or eliminate audible noise associated with producing tactile stimulation with the tactile device. In producing and adjusting tactile stimulation, phased arrays of ultrasound transducers are used to create acoustic fields that can be electronically controlled by adjusting the phase and amplitude of signals delivered to the transducers. The phase reflects the relative timing between transducer signals. Changes to the coherent acoustic field (e.g., to reflect digital/virtual object movements and/or user movements) may be done by altering the phase and amplitude of the transducers in the array. The system can focus the pressure output of an array of ultrasound transducers (e.g., to produce a strong enough signal to be discernible by the user) by using a precise frequency, amplitude and a phase delay for each transducer. For example, the phase can be changed to move an ultrasound beam focused in the array's field of emission.

The method by which an array's phase and amplitude is transitioned from one state to another can impact performance. This is especially true for methods where the time between transitions is smaller than the duration of the ultrasound signal (e.g., where the transition occurs when the array is emitting signals) and/or when the change in signal results in a large change in overall frequency of the wave composed of the prior wave and the new wave (e.g., as indicated in the large width of the "off" portion of the second wave in FIG. 5).

Figure 5:
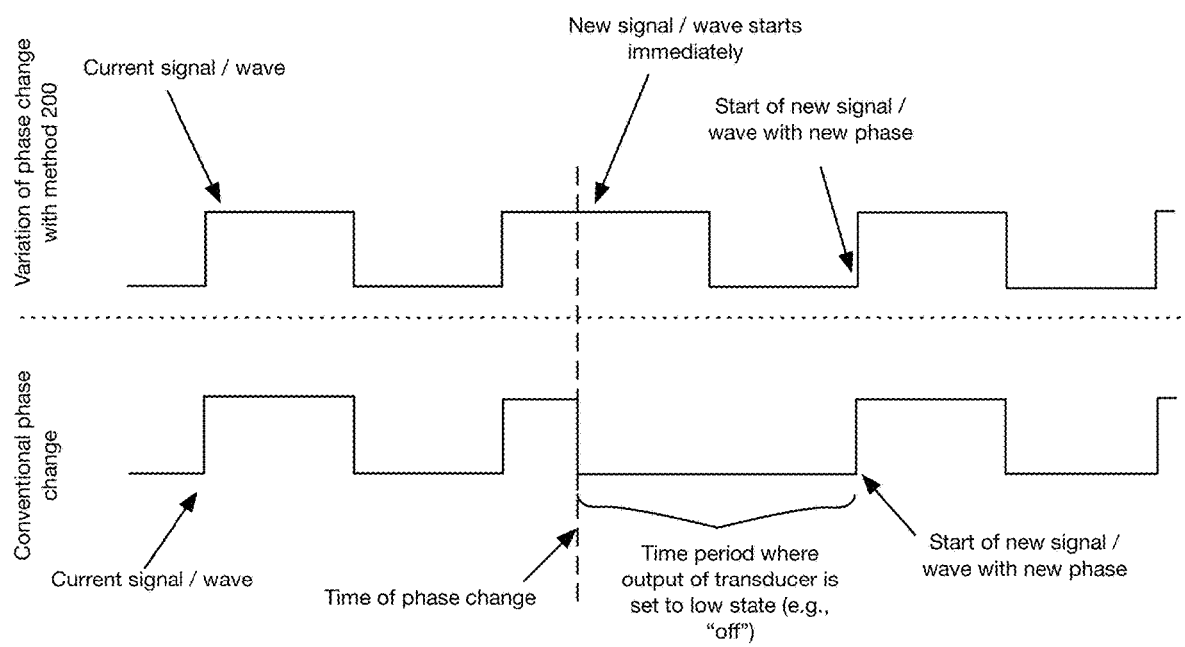
FIG. 5 depicts a comparison in phase change of a set of square wave signals emitted by a transducer.

Conventional methods for changing phase and optionally amplitude in ultrasound systems up to this point, for instance, implement an on/off phase change (e.g., as shown in FIG. 5), equivalently referred to herein as a stop/start implementation, which requires a much simpler memory architecture, as anytime the phase is changed, all transducers are turned off simultaneously and then turned back on with the new phase assignments. An example of this, for instance, involves stopping the drive signal to all the elements of a transducer array for a brief time to change the phase. Subsequently, the system may turn on the drive signal the elements and the array can transmit as needed.

According to these conventional embodiments (stop/start implementations), such as shown in the bottom wave FIG. 5, the system stops outputting the signal at the time of phase change, and starts outputting signal with the new phase at the "start of new signal" time, thus creating a period of time where output is set to low state (e.g., "off"). This transition occurs when the transducers are emitting signals. In the case of acoustic systems, the abrupt changes in phase and amplitude can cause large instantaneous changes in the acoustic field and resulting in large fluctuations in the associated radiation pressure. These changes in radiation pressure can cause undesired audible noise. The transition can also temporarily reduce transmitted power after the time of phase change due to the instantaneous frequency of the drive signal to the transmitter moving out of the bandwidth of the transmitter. For these stop/start systems, disruption in the drive signal would be present even if there was no phase or amplitude change in the initial and final signals.

The inventors have discovered, however, that these abrupt changes in phase and amplitude cause large instantaneous changes in acoustic field and significant fluctuations in associated radiation pressure, which results in substantial audible noise in ultrasound systems. When producing tactile stimulation ultrasound, the emitting of ultrasound essentially pushes on the air surrounding the device, such as in a tactile interaction volume. Implementing phase changes in this conventional manner with its on/off phase change causes sudden and drastic pressure disruptions to the air (equivalently referred to herein as radiation pressure), which occur at audible frequencies which the human ear can hear and which are typically extremely unpleasant. This is further exacerbated as the number of transducers increases—however a large number of transducers is required in order to provide high resolution tactile stimulation. As such, conventional methods are not sufficient to provide high resolution, mid-air ultrasound stimulation.

In preferred variations of the method 200, the method 200 functions to enable direct phase change of the transducers of the tactile device which reduces disruption (e.g., sudden disruption) of the acoustic field proximal to the tactile device, wherein direct phase change herein refers to phase change which does not require that all of the transducers be turned off prior to initiating a phase change. In these variations, the method 200 implements a direct phase change to minimize the difference between the transition signal and the initial and final drive signals, which potentially have different phases, thereby reducing disruption of the acoustic field and radiation pressure produced from phase and amplitude transitions of the signals driving ultrasound transducers. For example, according to some embodiments, a direct phase change system may utilize a dual memory architecture to allow for minimum disruption of phase and amplitude transitions. Using this approach, stopping and starting the driving signals (e.g., setting the signal to a low/off state for period of time to create signal shift) to the transducers can be avoided, the system may directly transition the drive signals from initial to final states thereby minimizing the instantaneous frequency changes (e.g., change of the driving signals during transition). Additionally or alternatively, the method 200 can function to enable any other kind of phase change.

The method 200 further preferably functions to reduce and/or eliminate audible noise in changing phase and/or amplitude (and/or any other parameters) of the set of transducers through group control, in which the set of transducers are divided into a particular set of groups, and wherein the groups are changed in signal at different times. This can, in turn, enable the system to provide high-resolution tactile stimulation with multiple (e.g., a large number) of transducers without creating significant and/or distracting audible noise.

The method 200 can additionally or alternatively perform any other suitable functions.

The method 200 is preferably performed with a system 100 as described above, further preferably with a processing subsystem of the system 100, but can additionally or alternatively be performed with any other suitable system(s) and/or components. Additionally or alternatively, any or all of the processes of the method 200 can be performed in accordance with one or more operation modes of the system 100 as described above. Further additionally or alternatively, the method 200 can be otherwise suitably performed.

Any or all of the method 200 is preferably performed continuously during operation of the system 100, and/or at least when a digital object is moving and/or the user is moving relative to the tactile device. Additionally or alternatively, the method 200 can be otherwise performed.

4.1 Method: Receiving a Set of Waveform Signals Associated with a Set of Transducers S210

The method 200 can include receiving a set of waveform signals associated with a set of transducers S210, which preferably functions to initiate a change in output of the transducers in order to alter (e.g., move, change size, change shape, etc.) the stimulation provided. This can in turn function to make the haptic stimulation feel more immersive to the user, enable the user to manipulate digital objects, enable the digital objects to adapt to the user's movement, and/or perform any other functions which improve the user experience. Further additionally or alternatively, S210 can function to perform any other suitable functions.

S210 is preferably performed initially during the method 200 and further preferably continuously during operation of the tactile device, but can additionally or alternatively be performed later in the method 200, multiple times during the method 200, and/or at any other suitable times. Additionally or alternatively, the method 200 can be performed in absence of any or all of S210.

The set of waveform signals (e.g., square wave signals) received in S210 preferably correspond to (e.g., are used to determine) the next signals (e.g., waveforms, sinusoidal waveforms, etc.) to be provided by the transducers, wherein the transducers are producing a current signal and/or not providing any signal. Additionally or alternatively, any other information can be received in S210, such as any or all of: information used to determine the set of signals (e.g., user location information from the tracking subsystem and/or digital object coordinates); information related to the current set of signals; signals to be provided farther in the future than the very next signals; historical information and/or historical signals; a change in signal between the current signals and the next signals; and/or any other suitable information.

Further additionally or alternatively, S210 can include determining the set of signals, such as with one or more beamforming algorithms at a processing subsystem of the system (e.g., as described above). Additionally or alternatively, S210 can include any other suitable processes.

The set of signals received in S210 preferably includes a collective set of waveforms associated with the set of transducers, wherein the collective set of waveforms is equivalently referred to herein as an array state. The set of signals can optionally additionally be received with one or more temporal parameters associated with the timing of the signal change. Additionally or alternatively, any other suitable information can be received.

A new set of signals can be received at any or all of: continuously (e.g., at a predetermined frequency, based on a clock, etc.), at random intervals, in response to a trigger (e.g., detection that the digital object has moved relative to the user), and/or at any other suitable times. The set of signals can be received for all transducers at once, one transducer at a time, one group at a time, and/or in any other suitable ways.

The set of signals is preferably received at and/or determined at a processing subsystem of the system, further preferably based on one or more algorithms of the processing subsystem, wherein the set of one or more algorithms preferably includes at least one or more beamforming algorithms and optionally any other suitable algorithms. The set of signals can additionally or alternatively be received from a computing subsystem (e.g., onboard computing subsystem, remote computing subsystem, etc.), storage (e.g., a database), and/or any other suitable components and/or information sources.

In preferred variations, for instance, the set of signals is determined based information (e.g., location, size, surface features, etc.) of a digital object being represented and tracking information of a user (e.g., location of user's hand), along with a beamforming module (e.g., at the processing subsystem), wherein the beamforming module (e.g., beamforming algorithms, beamforming model, etc.) determines a timing and location of stimulation, which is used to determine an array state associated with the set of transducers (e.g., set of phases for the set of transducers), this array state represented with the set of signals.

The set of signals preferably represent a waveform associated with the stimulation provided by each of the transducers, such as an oscillating set of voltages (e.g., a maximum and a minimum voltage, a maximum voltage and zero voltage, etc.) representing a square wave of stimulation. The square wave is preferably a true square wave with 50% duty cycle, but can additionally or alternatively have any other duty cycle (e.g., less than 50%, greater than 50%, etc.), varying amplitudes, and/or any other features. In some variations, for instance, varying the duty cycle of the wave can function to effectively change the intensity of the stimulation. In specific examples, for instance, decreasing the width of the portion in which the wave is at maximum output can effectively function to decrease the intensity of the output stimulation (e.g., pulse wave modulation or pulse density modulation).

Additionally or alternatively, the waveform can be represented with any other parameters (e.g., frequency, phase, etc.). Further additionally or alternatively, the signals can represent any other suitable waveforms, such as, but not limited to, any or all of: sine waves, ramps, other waveforms, and/or any combination.

In a preferred set of variations, the signals include (and/or are used to determine) a set of binary inputs, wherein the binary inputs represent whether the waveform (e.g., the square wave) is at a maximum amplitude or a minimum amplitude (e.g., zero). This can then be used, for instance, to determine and/or prescribe a phase associated with the signal. This can be seen, for instance, in a matrix representation of the square wave signals in FIGS. 8A-8D. Additionally or alternatively, the signals can be represented with non-binary inputs, wherein the values in the matrix correspond to a range of amplitude values, for instance. In some variations, for instance, the signal representation of the wave includes a signal phase value and/or any number of other values.

Figure 8A:
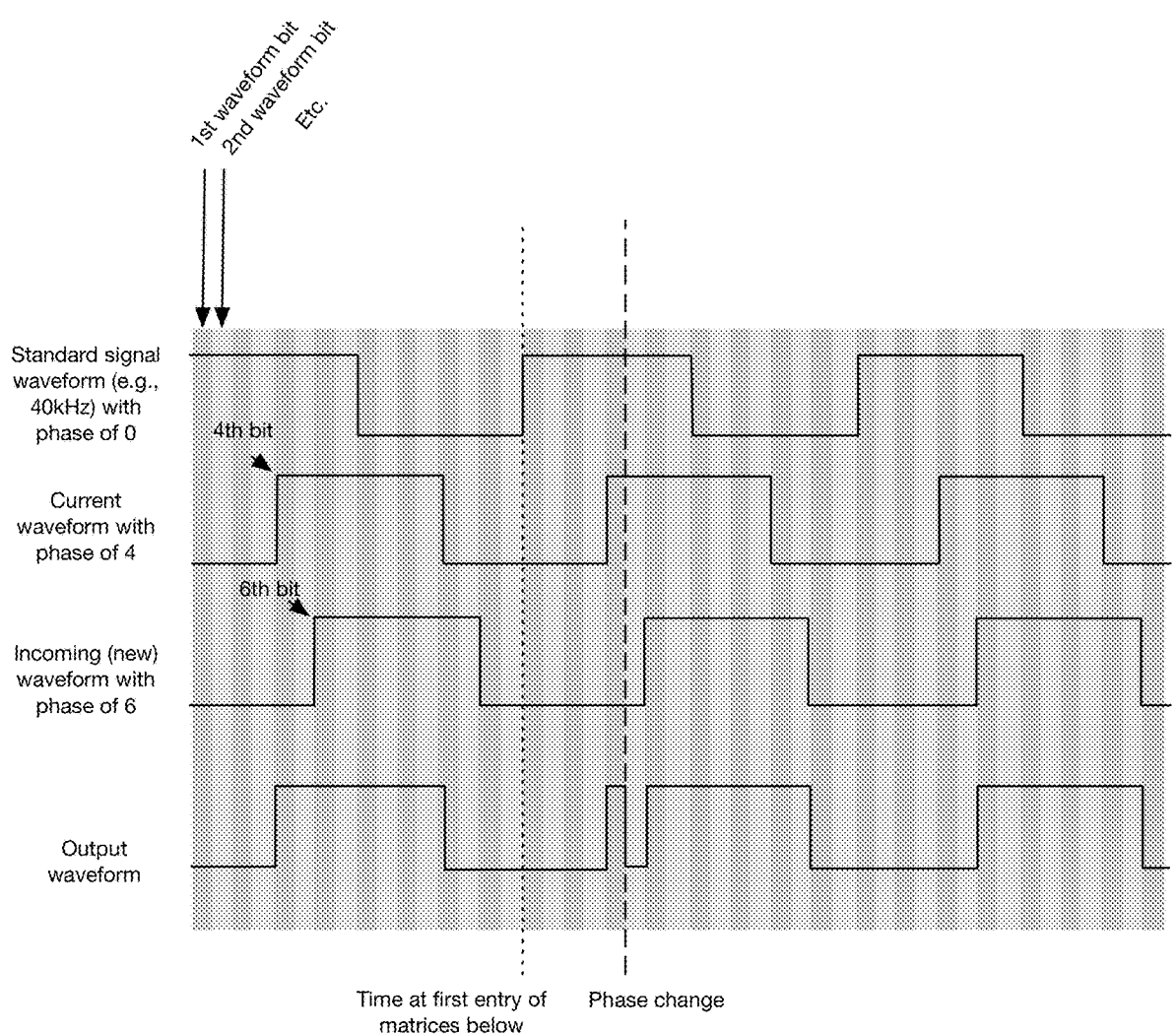
FIGS. 8A-8D depict a variation of the method for implementing phase change with a dual memory architecture.
Figure 8B:
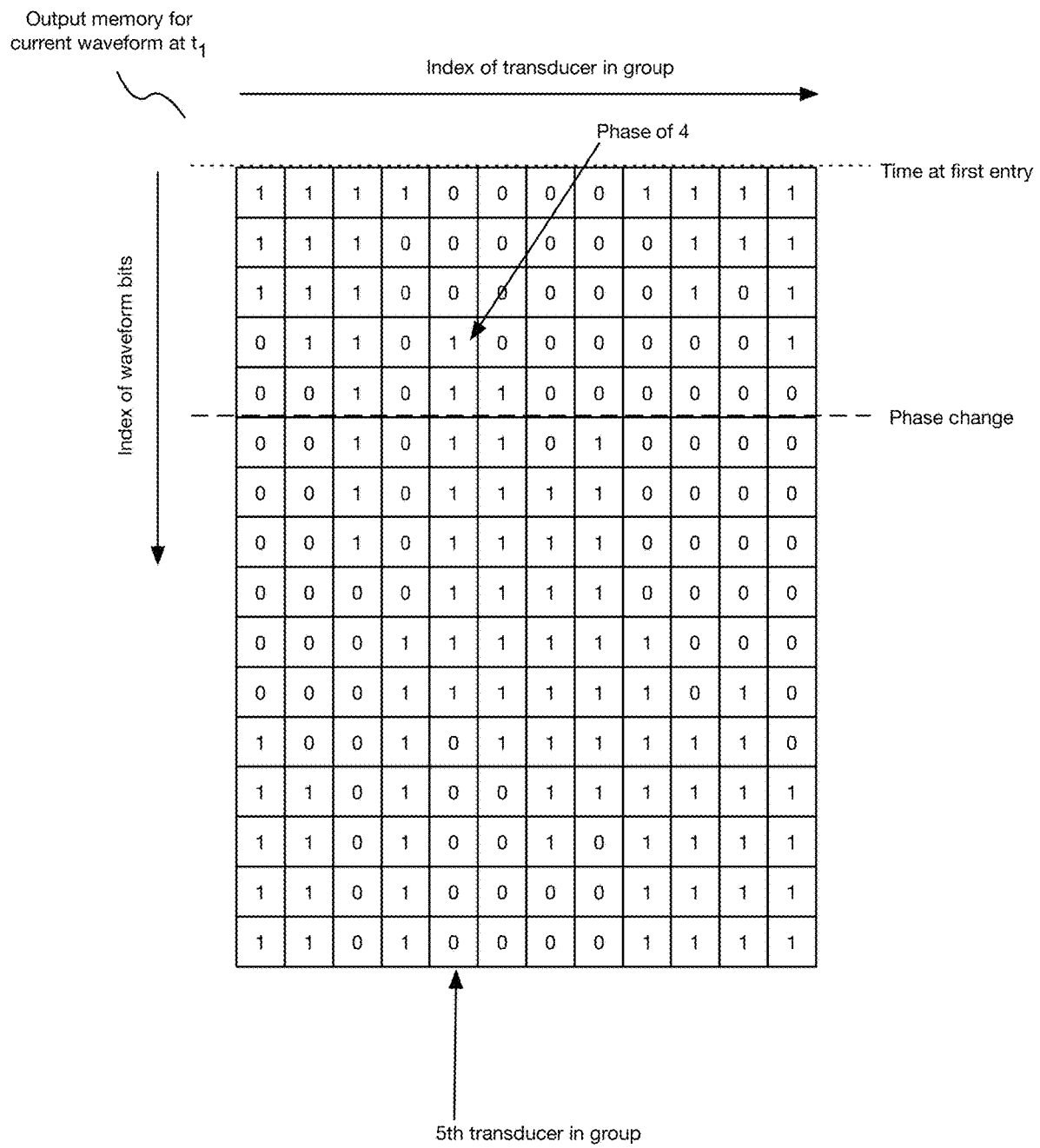
Figure 8C:
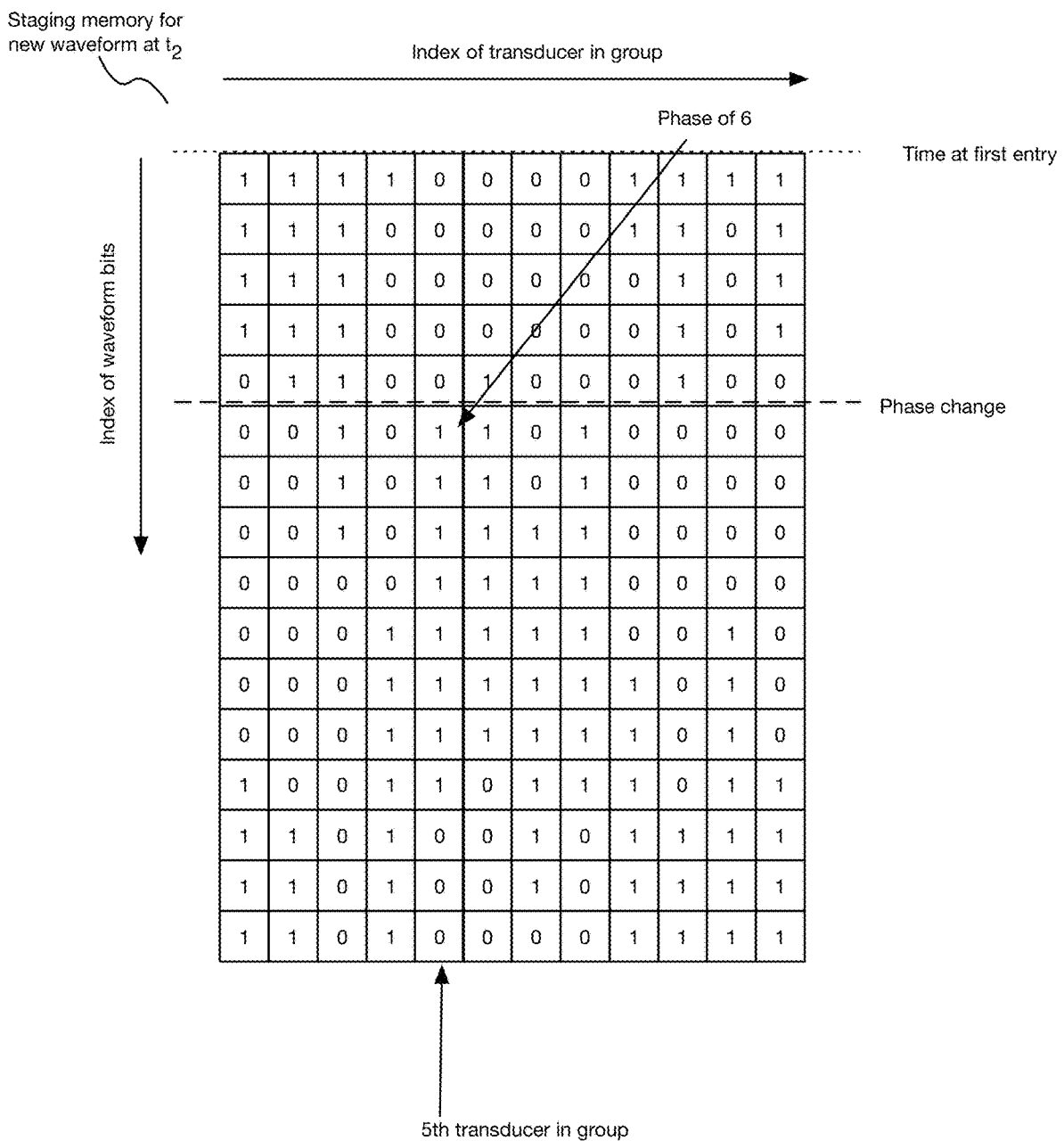
Figure 8D:
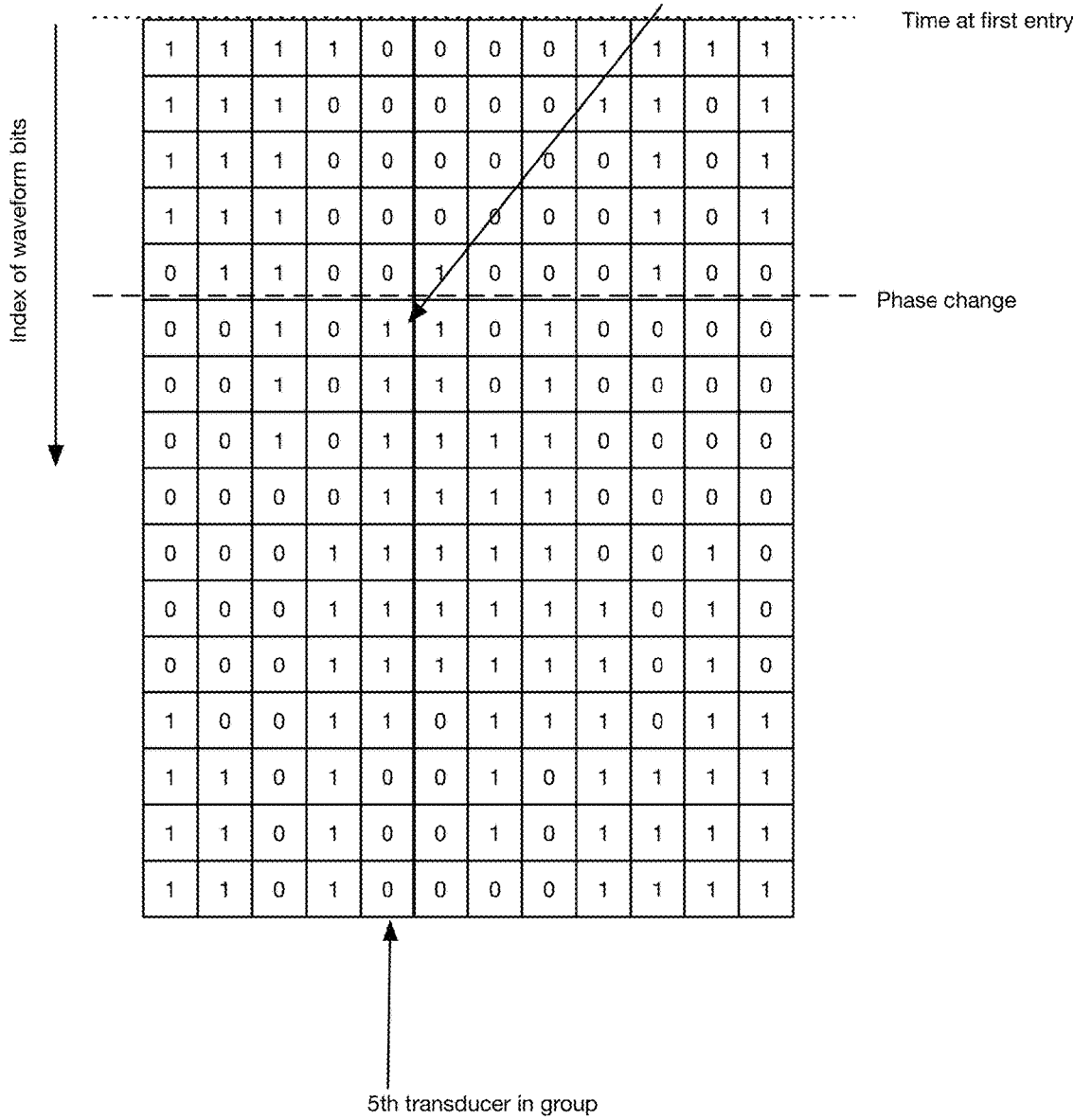

In a first variation, S210 includes receiving a set of signals (e.g., representing a square wave signal) each having a particular phase (e.g., as represented with the position of the first non-binary entry in the matrices in FIGS. 8B-8D), wherein the set of signals are received in response to determining that the stimulation needs to change (e.g., based on a change in position of the digital object, based on a change in the user's position relative to the tactile device, etc.). In specific examples, the set of signals include binary representations of a set of square wave signals with various phase values, wherein the various phase values determine the location and/or intensity of the resulting stimulation. In alternative specific examples, the signals represent a different waveform (e.g., sine wave).

In a second variation, additional or alternative to the first, S210 includes receiving a set of signals (e.g., representing a square wave signal) each having a particular phase (e.g., as represented with the position of the first non-binary entry in the matrices in FIGS. 8B-8D), wherein the set of signals are received continuously (e.g., at a predetermined frequency). In specific examples, the set of signals include binary representations of a set of square wave signals with various phase values, wherein the various phase values determine the location and/or intensity of the resulting stimulation. In alternative specific examples, the signals represent a different waveform (e.g., sine wave).

In a third variation, additional or alternative to any or all of those described above, S210 includes determining the set of signals with a set of beamforming algorithms, wherein a phase associated with each of set of signals (e.g., square wave signals) received at the transducers is determined based on a set of one or more beamforming algorithms.

In a fourth variation, additional or alternative to any or all of those described above, the signals received in S210 include an array of phase values (e.g., associated with a set of square waves), wherein the signals can be determined (e.g., in the matrices shown in FIGS. 8B-8D) based on the array of phase values.

Additionally or alternatively, S210 can include any other suitable processes and/or be otherwise performed.

4.2 Method: Organizing the Set of Waveform Signals into a Set of Groupings S220

The method 200 can include organizing the set of waveform signals into a set of groupings S220, which functions to limit the number of transducers experiencing a change in signal at any given time. Additionally or alternatively, S220 can function to maximize a distance between transducers which experience a change at any given time. Further additionally or alternatively, S220 can perform any other suitable functions.

S220 can be performed in response to S210, prior to S210, once for all instances of the method 200, and/or at any other time(s) during the method 200. Additionally or alternatively, the method 200 can be performed in absence of any or all of S220.

S220 can optionally include determining a set of groupings (equivalently referred to herein as groups) associated with the set of transducers, wherein each of the set of groupings includes a subset of the set of transducers. The division of the transducers into a set of groupings is preferably configured to reduce audible noise associated with the change in phase and/or other parameters of the signals emitted by the transducers. This can, in turn, enable the system to achieve high-resolution and/or intensely perceivable stimulation with a large number of transducers (e.g., 200, 300, 400, 500, 1000, 2000, between 300 and 500, at least 400, between 100 and 1000, greater than 1000, etc.).

The assignment of transducers into groupings is preferably predetermined and fixed, but can additionally or alternatively be dynamically determined and/or otherwise determined. The number of transducers in each group are preferably equal and/or substantially equal (e.g., differing by at most 1 transducer, differing by at most 2 transducers, differing by at most 3 transducers, differing by less than 10 transducers, differing by less than 1% of the total number of transducers, differing by less than 5% of the total number of transducers, etc.) among groups, but can alternatively be different.

The number of transducers in each group is preferably small enough to maximize a distance between transducers (e.g., as described above) but large enough to reduce the time to manage and execute the signals associated with all transducers. Additionally or alternatively, the number of transducers in each group be predetermined and/or otherwise determined.

In preferred variations, the number of transducers in each group is between 10 and 30 (e.g., 10, 15, 20, 25, 30, etc.), but can additionally or alternatively be less than 10, greater than 30, and/or any other number(s).

The transducer assignments are preferably configured to maximize a distance between transducers within each group (e.g., maximizing D1 and other transducer-to-transducer distances for Group 1 in FIG. 6B, maximizing D2 and other transducer-to-transducer distances for Group 2 in FIG. 6B, etc.). Maximizing the distances within each group can optionally include requiring any or all of: that an average distance satisfy a particular requirement (e.g., fall within a certain range of values, fall below a predetermined threshold, etc.); that each transducer-to-transducer distance satisfy a particular requirement; that each group have a predetermined number and/or fall within a range of numbers of transducers (e.g., 25 transducers, between 15 and 20 transducers, between 10 and 30 transducers, less than 10 transducers, greater than 30 transducers, etc.); that the selection of transducers follow a particular model and/or algorithm (e.g., nearest neighbors algorithm) and/or optimization process; and/or the assignments of transducers to groups can be otherwise performed.

In preferred variations, the particular transducers assigned to each group are determined with one or more nearest neighbors algorithms and/or processes, and/or an inverse of a nearest neighbors algorithm (e.g., farthest neighbors algorithm), which can be used to maximize the distance between transducers in each group. In specific examples, one or more nearest neighbors algorithms are used to select transducers which are farthest apart (aka least near) when assigning transducers to group modules and/or determining an ordered sequence of multiple groups.

The nearest neighbors algorithms can include, for instance, one or more k-nearest neighbors algorithms, ε-nearest neighbors algorithms, and/or any other nearest neighbors algorithms, such as, but not limited to, any or all of: exact nearest neighbors algorithms (e.g., linear search, Naïve search, space partitioning algorithms, branch and bound algorithms, spatial index/spatial methods algorithms, k-d tree algorithms, R tree algorithms, metric tree approaches, etc.); approximate nearest neighbors algorithms (e.g., Greedy search in proximity neighborhood graphs, locality sensitive hashing, nearest neighbor search, projected radial search, vector approximation, compression/clustering based search, etc.); and/or any other algorithms.

Additionally or alternatively, the transducers in each group can be determined with other algorithms (e.g., other proximity search algorithms, other optimization algorithms, etc.), one or more machine learning models, and/or can be determined in any other suitable way.

In a first variation, in determining each of a set of groups, a first transducer is selected (e.g., randomly, based on a previous group assignment, etc.), a nearest neighbors algorithm is used to select a second transducer in the group which is associated with a maximum distance to the first transducer, a third transducer is selected with the nearest neighbors algorithm such that the third transducer has a maximum distance (e.g., maximum average distance, maximum sum of distances, etc.) to the first 2 transducers, and then this is repeated until the group is complete (e.g., based on a predetermined number of transducers, until a threshold distance is exceeded in the selection of a next transducer, etc.).

In alternative variations, the nearest neighbors algorithm(s) can be otherwise implemented.

The set of group assignments are preferably used to determine a set of matrices of signal information (e.g., as described in S230), wherein each group is associated with its own matrix and/or matrices. Additionally or alternatively, matrices can be shared among multiple groups, a single matrix can be determined for all groups, and/or matrices can be otherwise determined.

S220 can optionally additionally or alternatively include determining a set of temporal parameters associated with the set of groupings, such as an order in which the groups are actuated and/or a temporal spacing between the actuation of different groups. In preferred variations, the order in which the groups are actuated is configured to maximize the distance between transducers which are actuated sequentially. In variations, for instance, in which a second group of transducers is actuated following a first group, the distance between the first group of transducers and the second group of transducers (e.g., D2 in FIG. 6B) is preferably maximized. This order can be determined with a nearest neighbors algorithm (e.g., as described above, different than that described above, etc.) and/or with any other suitable algorithms and/or models.

A temporal spacing between the actuation of groups can be any or all of: predetermined, dynamically determined (e.g., during performance of S230), fixed, dynamic, and/or otherwise configured.

In a first variation, S220 includes assigning the set of transducers into a set of groups (e.g., having multiple transducers in each group, having a single transducer in each group, etc.), wherein the subset of transducers in each group is determined with a set of one or more nearest neighbors algorithms, and wherein each group is configured to be actuated in series (e.g., rather than in parallel). This can be performed at any or all of: contemporaneously (e.g., in parallel with, during, etc.) with assigning transducers to groups, in series with assigning transducers to groups, any combination, and/or any other suitable times. In specific examples, the order in which the groups are actuated is further determined with a nearest neighbors algorithm. In alternative examples, the order in which groups are actuated is determined otherwise (e.g., with another algorithm, randomly determined, etc.).

In a first specific example of the first variation, S220 includes determining the transducers in each group based at least in part on the adjacent groups of transducers, wherein the adjacent groups can include a previous group which will be actuated immediately prior to the group being determined and/or a subsequent group which will be actuated immediately following the group being determined. For instance, in determining a second group of transducers, not only are the distances between transducers in the second group maximized, but the transducers in the second group are further selected such that they have a maximum distance with any or all of the transducers in the first group (e.g., the last transducer actuated in the first group, all transducers in the first group, etc.) and/or the third group configured to be actuated after the second group.

In a second specific example of the first variation, S220 includes determining all of the groups individually and then ordering them to maximize distances between transducers in adjacent groups.

Additionally or alternatively, the transducers can be otherwise assigned.

In a second variation, S220 includes assigning the set of transducers into a set of groups, wherein the subset of transducers in each group is determined with a set of one or more nearest neighbors algorithms, and wherein each group is actuated in parallel.

In a third variation, the transducers are assigned into groups based on another algorithm and/or model, and/or the transducers are randomly assigned into groups.

S220 can additionally or alternatively include any other suitable processes and/or be otherwise performed.

4.3 Method: Assigning a Set of Waveform Parameters to the Set of Transducers Based on the Set of Waveform Signals and/or the Set of Groupings S230

The method 200 includes assigning a set of waveform parameters to the set of transducers based on the set of waveform signals and/or the set of groupings S230, which functions to determine the provision of tactile stimulation to the user (e.g., in S240). Additionally or alternatively, S230 can function to reduce and/or eliminate audible noise ultimately produced with the tactile stimulation (e.g., based on a dual memory architecture and/or group control) and/or perform any other suitable functions.

S230 is preferably performed after S210 and optionally after S220, but can additionally or alternatively be performed prior to S210, prior to S220, in absence of S210, in absence of S220, as part of S210, as part of S220, multiple times during the method 200, and/or at any other suitable times. Additionally or alternatively, the method 200 can be performed in absence of any or all of S230.

S230 is preferably performed with a processing subsystem (e.g., as described above) and a memory subsystem (e.g., as described above), but can additionally or alternatively be performed with any other components of the system 100 and/or with any other suitable system(s). S230 is further preferably performed in accordance with a group control module as described above, but can additionally or alternatively be performed with any other suitable modules, in absence of modules, and/or in any other suitable ways.

S230 is preferably performed with a dual memory architecture including a staging memory (e.g., as described above), which functions to store the upcoming wave signals while they are being filled into a matrix (e.g., until all signals for all transducers in the group are completed), and an output memory (e.g., as described above), which is used by the driver subsystem to provide the stimulation once the information from the staging memory is copied over (e.g., as shown in FIG. 8D). The staging memory and output memory are preferably in communication, but can additionally or alternatively be separate and distinct (e.g., arranged at different processing subsystems) and/or otherwise arranged. Additionally or alternatively, a single memory architecture, another memory architecture (e.g., including more than 2 memory, etc.), and/or any other suitable architecture can be used.

In preferred variations, for instance, S230 functions to implement direct phase change (e.g., as described above), which can implement a transition signal to minimize the difference between the initial and final drive signals (which have potentially different phases), thereby reducing disruption of the acoustic field and radiation pressure produced from phase and/or amplitude transitions of the signals driving ultrasound transducers. The direct phase change is preferably performed with a dual memory architecture to allow for minimum disruption of phase and amplitude transitions. Using this approach, stopping and starting the driving signals (i.e., setting signal low for period of time to create signal shift) to the transducers can be avoided, the system may directly transition the drive signals from initial to final states thereby minimizing the instantaneous frequency changes (e.g., as demonstrated in FIG. 5) such as from changing of the driving signals during transition. Additionally or alternatively, S230 can function to implement any other phase changes.

S230 can optionally include, at a staging memory, assigning the set of waveform parameters to the set of transducers S232, which functions to temporarily store the new wave signals until they are copied over to the output memory for implementation. This, in turn, functions to enable a smooth transition between the current output of the transducers and the new output. Additionally or alternatively, S232 can function to store/hold (e.g., cache) a redundant set of signals and/or any other signals. Further additionally or alternatively, S232 can be otherwise performed and/or S230 can be performed in absence of S232.

S232 is preferably performed in response to receiving a new set of signals in S210, which can occur at any or all of: continuously, upon detecting a change in phase, at random intervals, and/or at any other suitable times. In preferred variations, for instance, S232 is performed in response to an output being produced by a set of beamforming algorithms. Additionally or alternatively, S232 can be triggered in response to determining that a new signal is different from a current signal, and/or can be triggered at any other suitable times.

The staging memory is preferably organized based on a set of groupings associated with the set of transducers, wherein each group is associated with its own matrix or matrices of information in the staging memory, such that the matrix and/or matrices of information can be ultimately implemented at the output memory in series. Additionally or alternatively, the staging memory can be organized independently of groupings (e.g., wherein the information is organized into different groupings at the output memory) and/or otherwise arranged or organized.

In a first set of variations, each group is associated with a matrix of signal parameters in the staging memory. In specific examples (e.g., as shown in FIG. 8B), each matrix has a set of entries (e.g., binary entries) corresponding to the signal amplitude associated with a square wave having a particular phase, wherein a first dimension (e.g., number of columns) is equal to the number of transducers in the group and a second dimension (e.g., number of rows) is equal to the number of "bits" in each signal for the time duration captured in the staging memory. A bit herein refers to an independently controlled portion of the signal. In FIGS. 8A-8D, for instance, the bits are represented as the vertical bars, wherein each wavelength is represented in 16 bits. Additionally or alternatively, the waves can be otherwise represented (e.g., with less than 16 bits, with more than 16 bits, etc.).

S230 can optionally additionally or alternatively include receiving a transition signal S234, which functions to trigger a transfer of information from the staging memory to the output memory.

The transition signal is preferably produced in response to determining that the staging memory is complete (e.g., all entries corresponding to the new signal have been completed/filled in). In variations in which the staging memory includes a separate matrix for each group, a transition signal can be produced an any or all of: an indication that all group matrices have been completed; an indication that a first group matrix has been completed; in response to each of the matrices being completed, wherein the number of transition signals is equal to the number of groups; and/or transition signals can be otherwise produced. Additionally or alternatively, the transition signals can be produced in response to any other suitable triggers.

Figure 4:
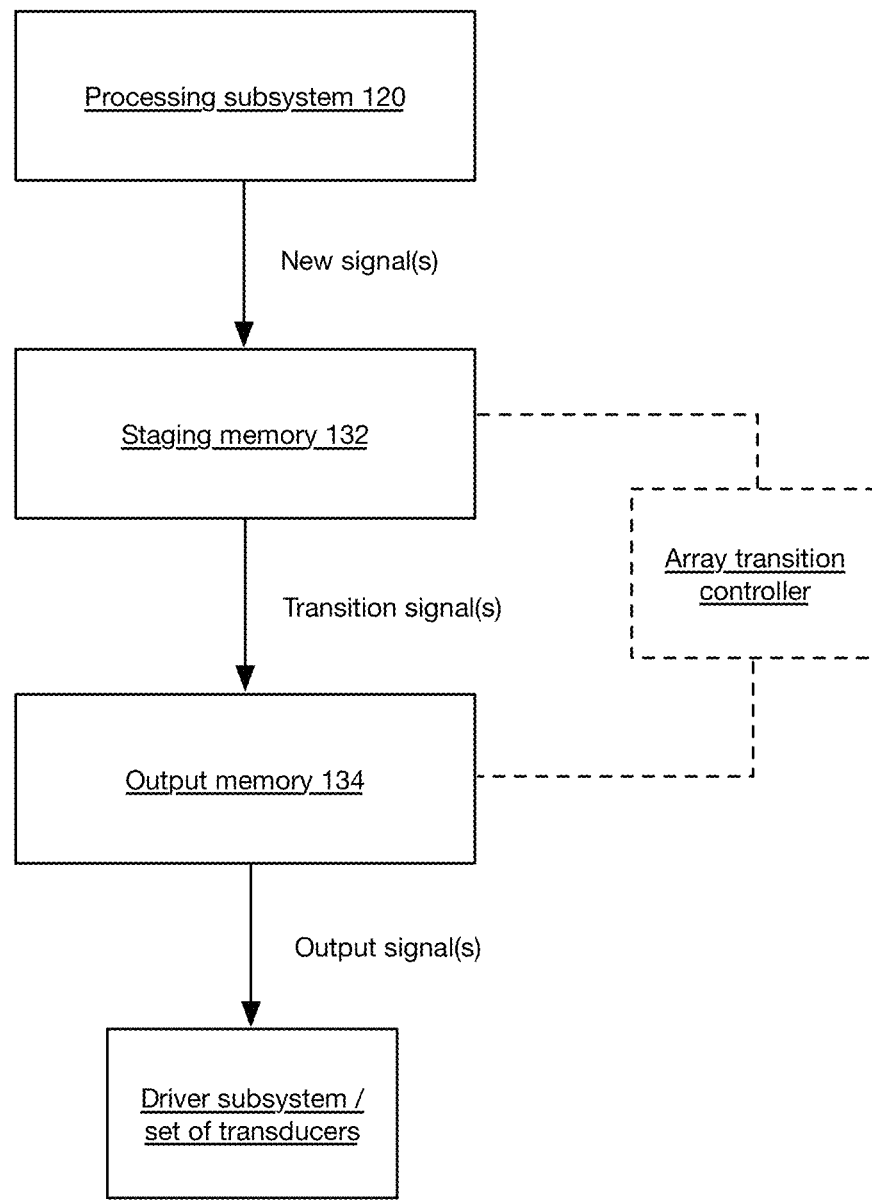
FIG. 4 is a schematic representation of a memory subsystem of the system.

The system 100 can optionally include an array transition controller (e.g., as shown in FIG. 4) for controlling the staging and outputting of signals. In preferred variations, the array transition controller functions to generate the transition signal. Additionally or alternatively, the transition signal can be produced with any other suitable components.

The array transition controller is preferably in communication with the processing subsystem and/or memory, but can additionally be part of and/or interface with a control subsystem of the tactile device, a driver subsystem of the tactile device, and/or any other components of the system.

S230 can optionally additionally or alternatively include updating an output memory based on the set of waveform parameters S236, which functions to implement the information in the staging memory at the set of transducers.

Updating the output memory preferably includes copying over information from the staging memory. The entire staging memory (e.g., for each group) is preferably transferred to the output memory in response to the transition signal, but additionally or alternatively, only a portion of the staging memory is transferred (e.g., only the portion occurring after the phase change as shown for instance in FIG. 8B), the two memory are combined (e.g., aggregated), and/or any other information can be transferred (e.g., from the output memory to the staging memory). Further additionally or alternatively, the output memory can be otherwise updated (e.g., replaced).

In preferred variations, the transferring process is completed prior to the next sampling of the output memory. For example, if the output signal consists of 16 samples, and the output memory sampling position is on sample four, then the copying should be completed before the output transitions to sample five. Additionally or alternatively, the transferring can be otherwise suitably implemented.

The output memory is preferably organized into different matrices (and/or any other signal storage tools) based on each group, but can additionally or alternatively be otherwise organized.

In a first set of variations, for instance, each group is associated with its own staging memory and its own output memory.

In a second set of variations, a single staging memory and a single output memory include instructions (e.g., programmed instructions) for all groups.

In a third set of variations, a dual memory architecture (e.g., dual read-write memory) is implemented within a single memory, such as a single deep memory, which is operated with programmed transition instructions to control the groups sequentially.

Additionally or alternatively, the memory can be otherwise suitably organized to perform group control. Further alternatively, the memory can operate in absence of group control.

S236 is preferably performed in response to the transition signal, but can additionally or alternatively be performed based on any other suitable triggers.

In preferred variations of S230, for instance, the output memory stores a digital drive signal for each array transmitter. The output signal for each transmitter may be created (e.g., in S240) by synchronously sampling the stored drive signals in output memory, wherein transmitter signals can be created, for instance, by 'clocking out' the output memory (e.g., with a circular buffer having a pointer determining the current bits set to the transducers of the group). The output memory can contain one signal cycle for each transmitter and be circularly sampled to provide continuous output signals for the transmitters. In some embodiments, when the system generates new signals to produce a new acoustic field (e.g., to move a focused beam), the system can input the new signals into a staging memory. The signals can consist of the drive signal for each transmitter on the phased array. When the signals for all the transmitters (e.g., all transducers of a single group, all transducers of a transducer array, etc.) have been loaded into the staging memory, the array transition controller can manage (e.g., based on a transition signal) the direct copying of the signals to the output memory. In specific examples, this is performed by reading from the staging memory (e.g., for each group's matrix) and writing to an output memory (e.g., for each group, for all groups, etc.), which enables the system to then produce new output signals with minimized disruption in phase and amplitude.

Additionally or alternatively, S230 can include any other suitable processes and/or be otherwise suitably performed.

4.4 Method: Controlling the Set of Transducers Based on the Set of Waveform Parameters S240

The method 200 can include controlling the set of transducers based on the set of waveform parameters S240, which functions to implement the change in signal of the transducers. Additionally or alternatively, S240 can perform any other suitable functions.

S240 is preferably performed in response to S230, but can additionally or alternatively be performed at any or all of: prior to S230, in response to S210, in response to S220, in absence of S230 and/or S220 and/or S210, multiple times during the method 200, and/or at any other times during the method 200. Additionally or alternatively, the method 200 can be performed in absence of S240.

S240 is preferably performed with a driver subsystem (e.g., as described above), but can additionally or alternatively be performed with the processing subsystem and/or any other suitable components of the system.

S240 is preferably performed with the information in the output memory produced in S230, wherein the output memory information is transmitted to the driver subsystem to be output by the set of transducers. Additionally or alternatively, the output memory can serve as an intermediate output, which is modified and/or used to create a set of inputs used by the driver subsystem, and/or any other suitable information from any suitable memory can be used to control the transducers.

S240 can optionally include implementing the output memory portions corresponding to each of a set of groups in series (e.g., with a temporal spacing, in quick succession, etc.), which functions to reduce the number of transducers being controlled at once. Additionally or alternatively, any or all of groups can be applied in parallel and/or any other combination. In variations including a temporal spacing between groups, the temporal spacing can be any or all of: predetermined, dynamically determined, fixed, variable, based on processing and/or implementation speeds, and/or otherwise determined.

Additionally or alternatively, S240 can include any other suitable processes and/or be otherwise suitably implemented.

5. Variations

Figure 9:
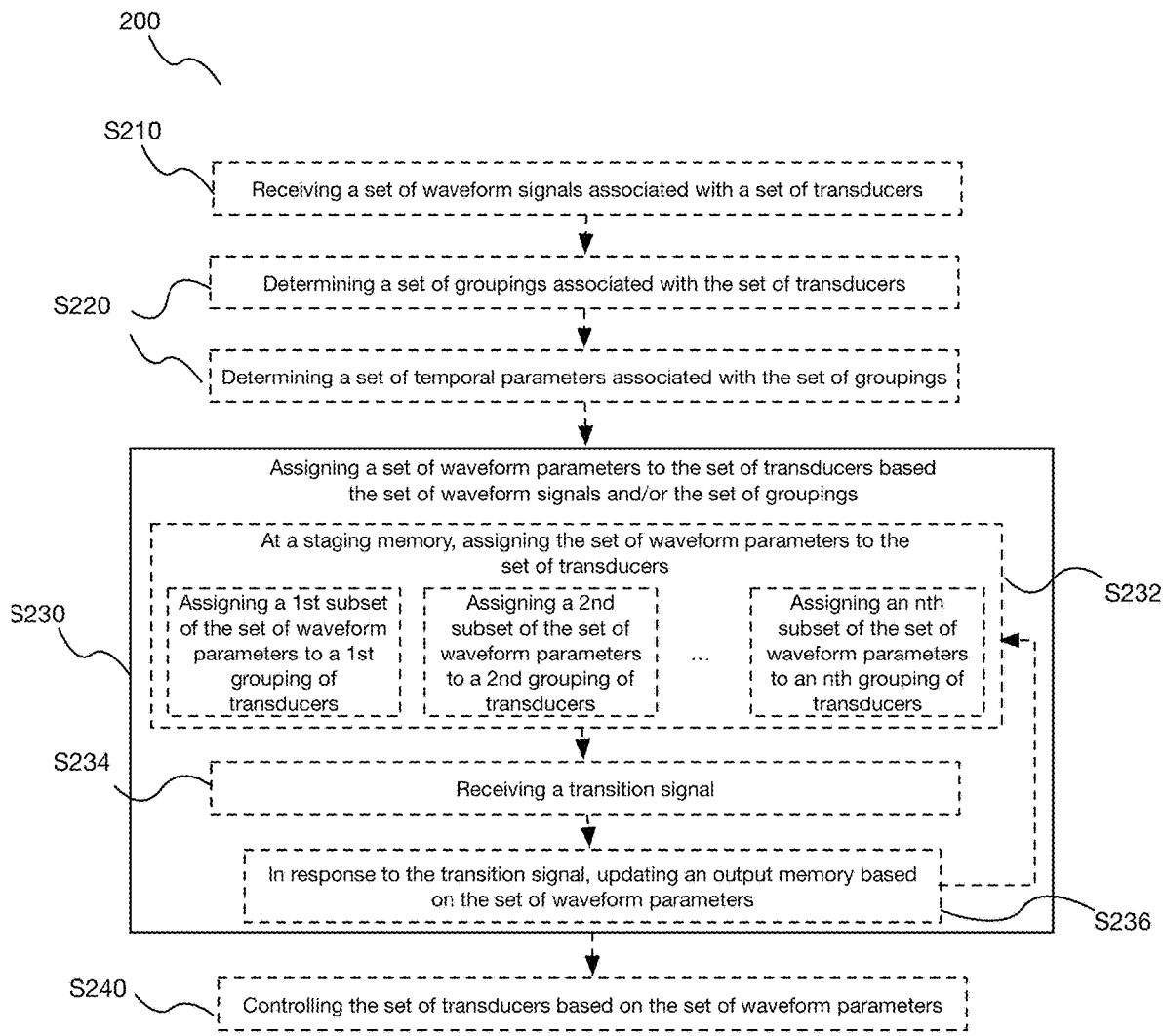
FIG. 9 depicts a schematic variation of the method for producing mid-air tactile stimulation.

In a first variation of the method 200 (e.g., as shown in FIG. 9), the method includes any or all of: receiving a set of waveform signals associated with a set of transducers; determining a set of groupings associated with the set of transducers; determining a set of temporal parameters associated with the set of groupings; assigning a set of waveform parameters to the set of transducers based on the set of waveform signals and/or the set of groupings, which can include any or all of: assigning the set of waveform parameters to the set of transducers at a staging memory, receiving a transition signal, and updating an output memory based on the set of waveform parameters in response to the transition signal; and controlling the set of transducers based on the set of waveform parameters. Additionally or alternatively, the method 200 can include any other suitable processes performed in any suitable order.

In a first set of specific examples, one or both of the set of groupings and the order in which the set of groupings are controlled is determined based on one or more nearest neighbors algorithms. Additionally or alternatively, the groupings and/or their order can be otherwise determined.

In an alternative variation of the method 200, the memory subsystem can include an architecture other than a dual memory architecture (e.g., a single memory architecture in which the entire transition wave including the final steady state wave is sent directly to the single memory).

In another alternative variation of the method, the method can be performed in absence of a set of groupings.

Additionally or alternatively, the method 200 can include any other suitable processes performed in any suitable order.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system for creating mid-air tactile stimulation, the system comprising:
   a tactile stimulation device comprising a set of multiple ultrasound transducers organized into a set of multiple groupings, wherein a first set of distances between the transducers within each grouping is maximized;
   a processing subsystem comprising:
      a dual memory architecture, wherein the dual memory architecture comprises:
         a first memory; and
         a second memory;
      a control subsystem comprising a transition controller, wherein the transition controller produces a transition signal in response to a trigger, wherein in response to the transition signal, the processing subsystem transmits information from the first memory to the second memory; and
   a driver subsystem in communication with the control subsystem and the set of multiple ultrasound transducers, wherein the driver subsystem implements the second memory at the set of multiple transducers.

2. The system of claim 1, wherein the first memory is a staging memory comprising information associated with a new set of signals.

3. The system of claim 2, wherein the second memory is an output memory comprising information associated with a current set of signals.

4. The system of claim 3, wherein the staging memory comprises a first set of waveform parameters associated with the new set of signals, and wherein the output memory comprises a second set of waveform parameters associated with the current set of signals.

5. The system of claim 4, wherein each of the first and second sets of waveform parameters comprises phase values.

6. The system of claim 1, wherein the processing subsystem further comprises a group control module configured to determine an order associated with the set of multiple groupings based on a set of physical distances between sequential groupings.

7. The system of claim 1, wherein the set of multiple groupings is determined with a nearest neighbors algorithm configured to maximize the first set of distances and a second set of distances.

8. The system of claim 7, wherein the first set of distances is defined based on an average distance between adjacent transducers within each grouping of the set of multiple groupings.

9. The system of claim 8, wherein the set of multiple groupings comprises a first grouping of ultrasound transducers and a second grouping of ultrasound transducers, wherein the second set of distances is defined based on an average distance between the first grouping of ultrasound transducers and the second grouping of ultrasound transducers.

10. The system of claim 1, wherein the trigger is related to a status of the first memory.

11. The system of claim 10, wherein the trigger comprises an indication that each entry in the first memory is complete.

12. A method for creating mid-air tactile stimulation at a tactile stimulation device comprising a set of multiple ultrasound transducers, the method comprising:
   organizing the set of multiple ultrasound transducers into a set of multiple groupings that maximize a set of distances between the transducers within each grouping;
   receiving a new set of signals associated with the set of multiple ultrasound transducers;
   storing information associated with the new set of signals at a first memory of a memory subsystem having a dual memory architecture;
   in response to a transition signal, replacing information associated with the current set of signals at a second memory of the memory subsystem with the information associated with the new set of signals; and
   implementing the second memory at the set of multiple ultrasound transducers.

13. The method of claim 12, further comprising determining a sequential order associated with the set of multiple groupings.

14. The method of claim 13, wherein implementing the second memory at the set of multiple ultrasound transducers comprises implementing the second memory at the set of multiple groupings based on the sequential order.

15. The method of claim 13, wherein determining the sequential order comprises maximizing a set of physical distances between sequential groupings within the sequential order.

16. The method of claim 12, wherein the first memory is associated with a first set of signals and wherein the second memory is associated with a second set of signals, wherein the first set of signals is configured to be applied at the set of multiple ultrasound transducers after the second set of signals.

17. The method of claim 16, wherein the first memory is a staging memory and the second memory is an output memory.

18. The method of claim 12, further comprising producing the transition signal in response to a trigger, wherein the trigger is related to a status of the first memory.

19. The method of claim 18, wherein the trigger comprises an indication that each entry in the first memory is complete.

* * * * *